United States Patent
Lee

(10) Patent No.: US 11,244,517 B2
(45) Date of Patent: Feb. 8, 2022

(54) DEVICE FOR GENERATING PRINTING INFORMATION AND METHOD FOR GENERATING PRINTING INFORMATION

(71) Applicant: SAMSUNG ELECTRONICS CO., LTD., Suwon-si (KR)

(72) Inventor: Jae-hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 977 days.

(21) Appl. No.: 15/545,852

(22) PCT Filed: Feb. 15, 2016

(86) PCT No.: PCT/KR2016/001483
§ 371 (c)(1),
(2) Date: Jul. 24, 2017

(87) PCT Pub. No.: WO2016/133318
PCT Pub. Date: Aug. 25, 2016

(65) Prior Publication Data
US 2018/0018830 A1 Jan. 18, 2018

(30) Foreign Application Priority Data
Feb. 17, 2015 (KR) .................... 10-2015-0024239

(51) Int. Cl.
*G06T 19/20* (2011.01)
*B33Y 30/00* (2015.01)
(Continued)

(52) U.S. Cl.
CPC .............. *G06T 19/20* (2013.01); *B33Y 30/00* (2014.12); *G06F 3/0481* (2013.01);
(Continued)

(58) Field of Classification Search
CPC ...................................................... B33Y 50/00
See application file for complete search history.

(56) References Cited

U.S. PATENT DOCUMENTS

| | | | |
|---|---|---|---|
| 5,467,411 A * | 11/1995 | Tanaka | G06K 9/00476 382/113 |
| 6,856,314 B2 * | 2/2005 | Ng | G06K 9/20 345/419 |

(Continued)

FOREIGN PATENT DOCUMENTS

| | | |
|---|---|---|
| CN | 101004748 A | 7/2007 |
| JP | 07-234949 | 9/1995 |

(Continued)

OTHER PUBLICATIONS

Jeehyung Lee et al. Sketch-Based Search and Composition of 3D Models. Eurographics (2008).

(Continued)

*Primary Examiner* — Akash Saxena
(74) *Attorney, Agent, or Firm* — Nixon & Vanderhye, P.C.

(57) ABSTRACT

Provided are a device and a method of generating printing information. The method includes acquiring at least one image part by splitting a basic image acquired based on a user input; determining a target article corresponding to the basic image from a three-dimensional (3D) article list stored in a database (DB) by using the at least one image part; providing a graphical user interface (GUI) capable of editing a shape of the target article according to a user input; and editing the shape of the target article, based on a user input via the GUI, and generating printing information used to 3D print the edited target article.

19 Claims, 24 Drawing Sheets

(51) Int. Cl.
*G06F 3/0481* (2013.01)
*G06T 17/05* (2011.01)
*B33Y 50/00* (2015.01)
*G06F 16/51* (2019.01)
*G06F 3/0484* (2013.01)
*G06F 3/12* (2006.01)
*G06F 16/532* (2019.01)
*G06T 1/00* (2006.01)
*G06F 113/10* (2020.01)

(52) U.S. Cl.
CPC ........ *G06F 3/04845* (2013.01); *G06F 3/1205* (2013.01); *G06F 3/1272* (2013.01); *G06F 3/1285* (2013.01); *G06F 16/51* (2019.01); *G06F 16/532* (2019.01); *G06T 1/0007* (2013.01); *G06T 17/05* (2013.01); *B33Y 50/00* (2014.12); *G06F 2113/10* (2020.01); *G06F 2216/17* (2013.01); *G06T 2219/2021* (2013.01)

(56) References Cited

U.S. PATENT DOCUMENTS

| | | | |
|---|---|---|---|
| 7,492,972 B2 | 2/2009 | Bober | |
| 8,983,646 B1* | 3/2015 | Hanna | G06T 17/20 700/119 |
| 9,811,076 B2* | 11/2017 | Guo | B33Y 50/00 |
| 2002/0067354 A1 | 6/2002 | Oh et al. | |
| 2002/0164074 A1* | 11/2002 | Matsugu | G06T 7/174 382/173 |
| 2003/0142097 A1* | 7/2003 | Sakagami | G06F 3/0481 345/473 |
| 2004/0207705 A1* | 10/2004 | Ozawa | B44F 11/02 347/101 |
| 2005/0025354 A1* | 2/2005 | Macy | G06T 7/0004 382/154 |
| 2005/0212797 A1* | 9/2005 | Lee | G06T 17/005 345/419 |
| 2006/0015497 A1* | 1/2006 | Keating | G06F 16/5838 |
| 2006/0269143 A1* | 11/2006 | Kozakaya | G06K 9/00288 382/218 |
| 2008/0188969 A1* | 8/2008 | O'Malley | G06T 17/00 700/97 |
| 2009/0276070 A1* | 11/2009 | Burkes | B33Y 50/00 700/98 |
| 2009/0304271 A1* | 12/2009 | Takahashi | G06T 7/11 382/165 |
| 2010/0257467 A1 | 10/2010 | Lu et al. | |
| 2011/0087350 A1 | 4/2011 | Fogel et al. | |
| 2011/0234581 A1 | 9/2011 | Eikelis et al. | |
| 2012/0019531 A1 | 1/2012 | Sabiston et al. | |
| 2012/0054177 A1 | 3/2012 | Wang et al. | |
| 2012/0109591 A1* | 5/2012 | Thompson | G06F 30/00 703/1 |
| 2013/0187905 A1* | 7/2013 | Vaddadi | G06T 17/00 345/419 |
| 2013/0249908 A1* | 9/2013 | Black | G06K 9/00369 345/420 |
| 2014/0058959 A1* | 2/2014 | Isbjornssund | B33Y 50/00 705/310 |
| 2014/0211224 A1* | 7/2014 | Abeloe | B33Y 50/00 358/1.9 |
| 2015/0112644 A1* | 4/2015 | Schmidt | G06F 30/00 703/1 |
| 2015/0134095 A1* | 5/2015 | Hemani | B29C 64/386 700/98 |
| 2015/0172773 A1* | 6/2015 | Klappert | H04N 21/4117 705/26.5 |
| 2016/0016362 A1* | 1/2016 | Kim | G05B 19/4097 700/98 |
| 2016/0063035 A1* | 3/2016 | Rejal | G06T 15/20 707/754 |
| 2017/0038767 A1* | 2/2017 | Cluckers | G06Q 30/0621 |
| 2017/0154215 A1* | 6/2017 | Niinuma | G06T 11/60 |
| 2017/0286567 A1* | 10/2017 | Hana | B33Y 50/00 |
| 2017/0308977 A1* | 10/2017 | Li | G06Q 50/184 |
| 2017/0309029 A1* | 10/2017 | Wang | G06T 7/11 |
| 2017/0323150 A1* | 11/2017 | Miura | H04N 1/00827 |
| 2018/0046167 A1* | 2/2018 | Iverson | G06K 9/00201 |
| 2018/0261037 A1* | 9/2018 | Hudson | G06F 3/0484 |
| 2020/0233400 A1* | 7/2020 | Wright | G06T 7/11 |

FOREIGN PATENT DOCUMENTS

| | | |
|---|---|---|
| JP | 2003-223094 | 8/2003 |
| JP | 2015-026122 | 2/2015 |
| WO | 2015015554 A1 | 2/2015 |

OTHER PUBLICATIONS

International Search Report dated May 17, 2016 for PCT/KR2016/001483 and English-language translation thereof.
Notice of Non-final Rejection dated Jan. 28, 2021 in counterpart Korean Patent Application No. 2015-0024239 and English-language translation.
Notice of Allowance dated Jul. 9, 2021 in Korean Application No. 10-2015-0024239 and English-language translation.

* cited by examiner

FIG. 20
| | |
|---|---|
| 2010 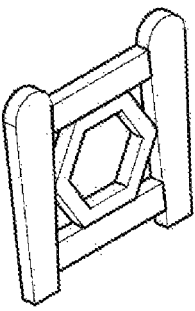 | 2040 WEIGHT: 1.7kg<br>SIZE: XXcm × XXcm × XXcm |
| 2020 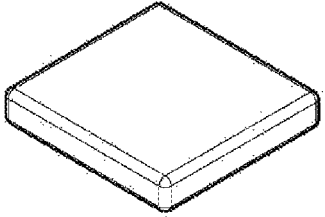 | 2050 WEIGHT: 1.9kg<br>SIZE: XXcm × XXcm × XXcm |
| 2030 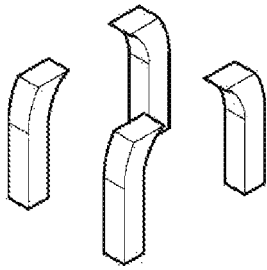 | 2060 WEIGHT: 2.1kg<br>SIZE: XXcm × XXcm × XXcm |

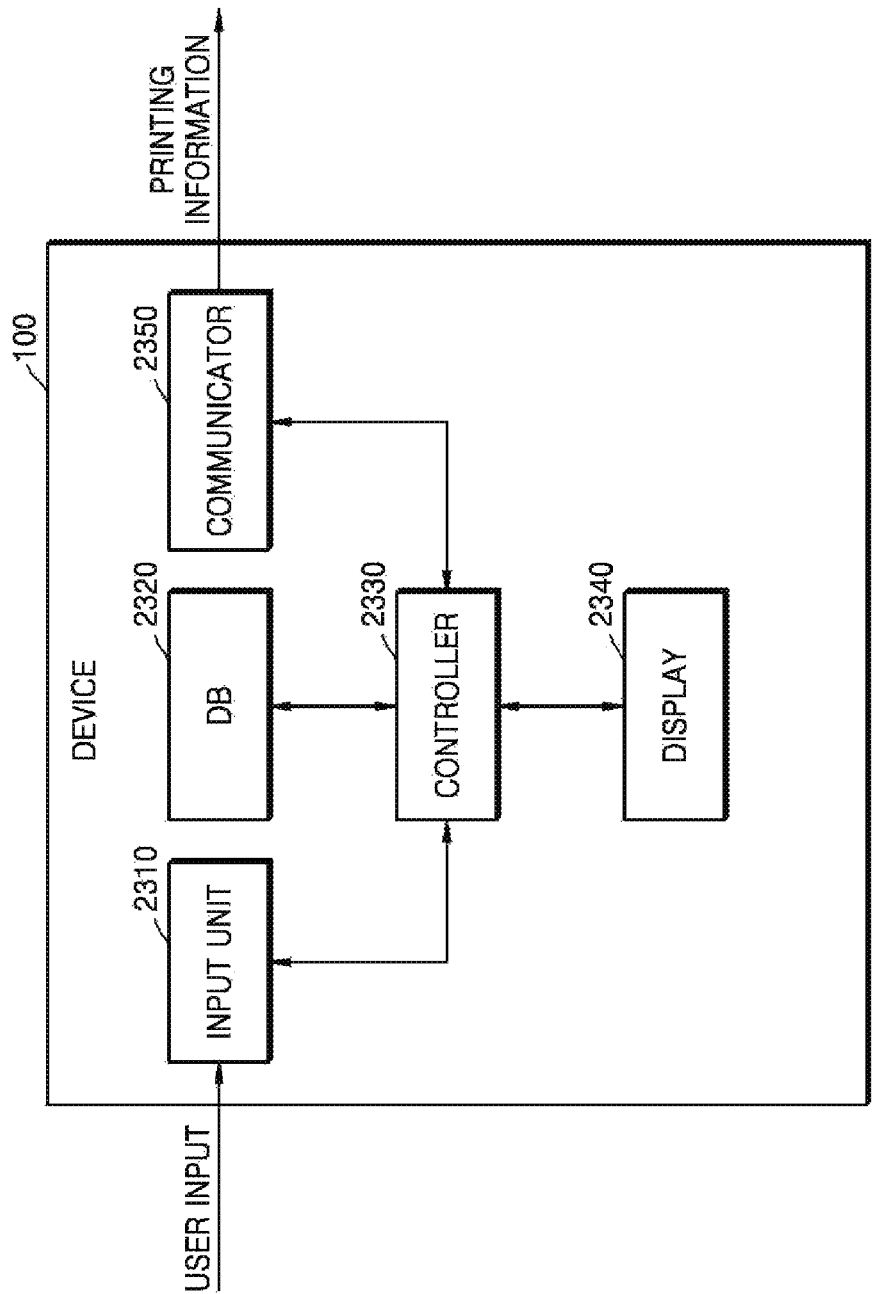

DEVICE FOR GENERATING PRINTING INFORMATION AND METHOD FOR GENERATING PRINTING INFORMATION

CROSS-REFERENCE TO RELATED APPLICATIONS

This application is the U.S. national phase of International Application No. PCT/KR2016/001483 filed Feb. 15, 2016 which designated the U.S. and claims priority to KR Patent Application No. 10-2015-0024239 filed Feb. 17, 2015, the entire contents of each of which are hereby incorporated by reference.

TECHNICAL FIELD

The present disclosure relates to devices and methods of generating printing information, and more particularly, to a device and method of generating printing information for three-dimensional (3D) printing.

BACKGROUND ART

With developments in multimedia technology and data processing technology, device are able to process various types of information. In particular, devices that generate and process three-dimensional (3D) printing information is being used with developments of 3D printers. However, it is difficult to clarify a 3D shape desired by a user.

Thus, a method for clarifying a 3D shape desired by a user and generating printing information for 3D printing is in demand.

SUMMARY

Provided are devices and methods of generating three-dimensional (3D) printing information of a 3D shape desired by a user.

According to an aspect of the present invention, a method of generating printing information includes acquiring at least one image part by splitting a basic image acquired based on a user input; determining a target article corresponding to the basic image from a three-dimensional (3D) article list stored in a database (DB) by using the at least one image part; providing a graphical user interface (GUI) capable of editing a shape of the target article according to a user input; and editing the shape of the target article, based on a user input via the GUI, and generating printing information used to 3D print the edited target article.

Provided methods of generating three-dimensional (3D) printing information of a 3D shape desired by a user.

BRIEF DESCRIPTION OF THE DRAWINGS

FIG. 20 illustrates an example in which a device according to some embodiments provides information about constituent articles;

FIG. 23 is a block diagram of a device according to some embodiments.

DETAILED DESCRIPTION OF EXAMPLE EMBODIMENTS

Figure 1:
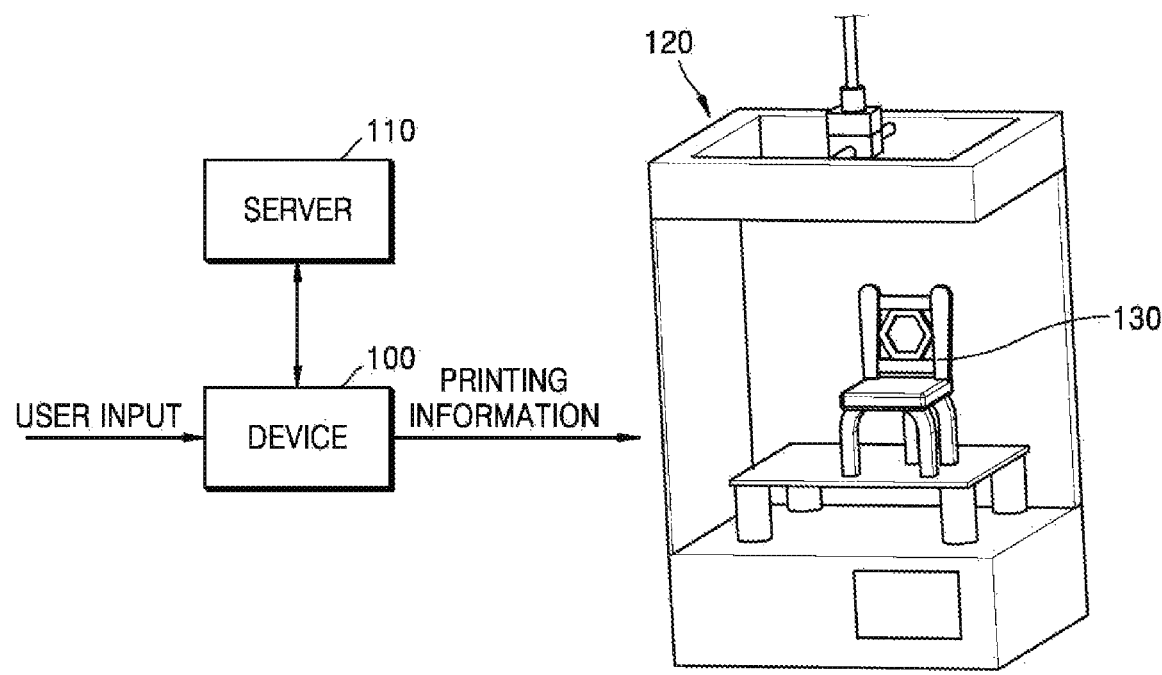
FIG. 1 illustrates an example in which a device according to some embodiments receives a user input and generates printing information.

According to an aspect of the present invention, a method of generating printing information includes acquiring at least one image part by splitting a basic image acquired based on a user input; determining a target article corresponding to the basic image from a three-dimensional (3D) article list stored in a database (DB) by using the at least one image part; providing a graphical user interface (GUI) capable of editing a shape of the target article according to a user input; and editing the shape of the target article, based on a user input via the GUI, and generating printing information used to 3D print the edited target article.

The providing of the GUI may include providing a recommendation list of constituent articles that are compatible with a constituent article included in the target article.

The providing of the recommendation list may include providing the recommendation list of the compatible constituent articles, based on stability of a target article edited by a constituent article included in the recommendation list.

The stability may be determined based on at least one of a location of the center of gravity of the target article edited by the constituent article included in the recommendation list and an internal structure of the edited target article.

The providing of the recommendation list may include providing the recommendation list of the compatible constituent articles, based on prices of the compatible constituent articles.

The providing of the recommendation list may include providing the recommendation list of the compatible constituent articles, based on sizes of the compatible constituent articles.

The providing of the recommendation list may include providing the recommendation list of the compatible constituent articles, based on a connection relationship between the target article and the constituent article included in the target article.

The generating of the printing information may further include generating manual information representing a method of assembling the edited target article.

The generating of the printing information may further include providing the manual information in at least one of a text form and an animation form.

The providing of the GUI may include providing an image representing an operation of a constituent article included in the target article according to a function of the target article.

The DB may store a connection relationship between the target article and a constituent article included in the target article.

The DB may store weight information of the constituent article included in the target article.

The DB may store information about at least one of a direction and a range in which the constituent article included in the target article moves according to a function of the target article.

According to another aspect of the present invention, a device for generating printing information includes an input unit configured to receive a user input; a DB configured to store a 3D article list; and a controller configured to acquire at least one image part by splitting a basic image acquired based on an input received via the input unit, to determine a target article corresponding to the basic image from a 3D article list stored in the DB by using the at least one image part, to provide a GUI capable of editing a shape of the target article according to a input received via the input unit, and to edit the shape of the target article, based on a user input via the GUI, and generate printing information used to 3D print the edited target article.

The device may further include a display configured to display at least one of the basic image, the target article, the edited target article, and the GUI.

The controller may provide a recommendation list of constituent articles that are compatible with a constituent article included in the target article.

The controller may provide a recommendation list of the compatible constituent articles, based on stability of the target article.

The controller may provide the recommendation list of the compatible constituent articles, based on sizes of the compatible constituent articles.

The controller may generate manual information representing a method of assembling the edited target article.

According to another aspect of the present invention, a non-transitory computer-readable recording medium has recorded thereon a program for executing the above-described method.

DETAILED DESCRIPTION

Embodiments of the present invention are described in detail herein with reference to the accompanying drawings so that this disclosure may be easily performed by one of ordinary skill in the art to which the present invention pertain. The invention may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The present invention will now be described more fully with reference to the accompanying drawings, in which exemplary embodiments of the invention are shown.

FIG. 1 illustrates an example in which a device 100 according to some embodiments receives a user input and generates printing information.

As shown in FIG. 1, a printing information providing system according to an embodiment of the present invention may include the device 100, a server 110, and a printer 120.

The device 100 may receive a user input. A user input according to an embodiment may be used to generate printing information. For example, the device 100 may acquire a basic image by using the user input and generate printing information by using the acquired basic image.

A basic image according to an embodiment is basically used to determine a target article. The basic image may be acquired according to a user input for acquiring an image.

For example, the basic image may include an image that is acquired via a sketch input. A sketch input according to an embodiment may denote an input obtained by a user performing a sketch via a touch on a screen where a touch input is possible. A sketch input according to another embodiment may denote an input obtained by the device 100 recognizing a sketching operation of a user.

As another example, the basic image may include an image acquired via photography according to a user input. For example, a desk image captured according to a user input of performing photography may be a basic image.

As another example, the basic image may include an image downloaded from a server according to a user input. For example, a chair image downloaded from a server according to a user input may be a basic image.

The device 100 may acquire a 3D article list from the server 110. The 3D article list may include information about a plurality of 3D articles. The device 100 may determine a target article corresponding to the basic image the 3D article list acquired from the server 110.

A target article according to an embodiment is an article that is to be edited. The target article may denote an article that is determined from the basic image based on similarity with the basic image from among the 3D articles included in the 3D article list. For example, the target article may denote an article corresponding to the basic image from among the 3D articles included in the 3D article list. As another example, the device 100 may select a 3D article having a most similar shape to the basic image from among the 3D articles included in the 3D article list, and may determine the selected 3D article as the target article. Whether the shape of the 3D article is similar to the basic image may be determined according to a predetermined criterion. As another example, the device 100 may select, as the target article, a 3D article that is included in the 3D article list and is most frequently used from among 3D articles having similar shapes to the basic image. A frequency of usage according to an embodiment may denote a frequency of exposure to the Internet. Being similar in shape according to an embodiment may denote a case where a shape similarity is equal to or greater than a predetermined reference when being determined according to a predetermined manner. For example, the device 100 may express a similarity between the shape of the basic image and that of a 3D article included in the 3D article list as a numeral between 0 and 100.

A target article according to another embodiment may denote an article that is selected based on a user input from among the 3D articles included in the 3D article list.

The device 100 may provide a graphical user interface (GUI) capable of editing the shape of the target article. The device 100 may edit the shape of the target article, based on an edition input which is a user input via the provided GUI. The device 100 may generate printing information used to 3D print the edited target article. The printing information is used to perform printing. The printing information may be generated by the device 100 and transmitted to the printer 120. According to an embodiment, the printer 120 may include a 3D printer.

According to an embodiment, the printer 120 may generate an edited target article 130 by using the printing information received from the device 100.

According to another embodiment, the printer 120 may generate the edited target article 130 by receiving printing information transmitted by the device 100 to the server 110 from the server 110.

According to an embodiment, the device 100 may store the 3D article list. For example, the device 100 may acquire information about 3D articles from the server 110 and store the acquired information. The information about the 3D articles may include information related with the 3D articles, such as images of the 3D articles and names of the 3D articles.

According to another embodiment, the device 100 may store information about the target article and information about connection relationships between the constituent articles included in the target article. The constituent articles may denote articles that constitute the target article. For example, since a chair may be formed of a chair back, a seat, and legs, the chair, which is a target article, may be formed of constituent articles which are the chair back, the seat, and the legs. In this case, the device 100 may store information about a relationship between the chair back and the seat and a relationship between the seat and the legs.

According to another embodiment, the device 100 may store weight information of the constituent articles included in the target article. For example, the device 100 may store respective weights of the constituent articles of the target article with preset accuracy. The preset accuracy may vary according to settings.

According to another embodiment, the device 100 may store information about at least one of directions and ranges in which the constituent articles included in the target article respectively move according to the function of the target article. For example, the device 100 may store information about a direction in which and an angle at which the back of the chair is tilt.

According to another embodiment, the device 100 may store information about the constituent articles included in each of the 3D articles stored in the device 100.

For example, the device 100 may index each of the constituent articles. In this case, the device 100 may store a result of the indexing.

As another example, the device 100 may store information about joins between the constituent articles. According to an embodiment, when the target article is a chair, the device 100 may store information about a join between a chair back and a seat of the chair. The device 100 may display the information about the joins. A method of displaying the information about the joins will be described later with reference to FIG. 12.

As another example, the device 100 may store information about operations of the constituent articles included in the target article. The meaning of the information about the operations of the constituent articles will be described later with reference to FIG. 22.

As another example, the device 100 may store information related with a method of assembling the target article by using the constituent articles. The information related with the assembling method will be described later with reference to FIGS. 15 and 16.

Figure 2:
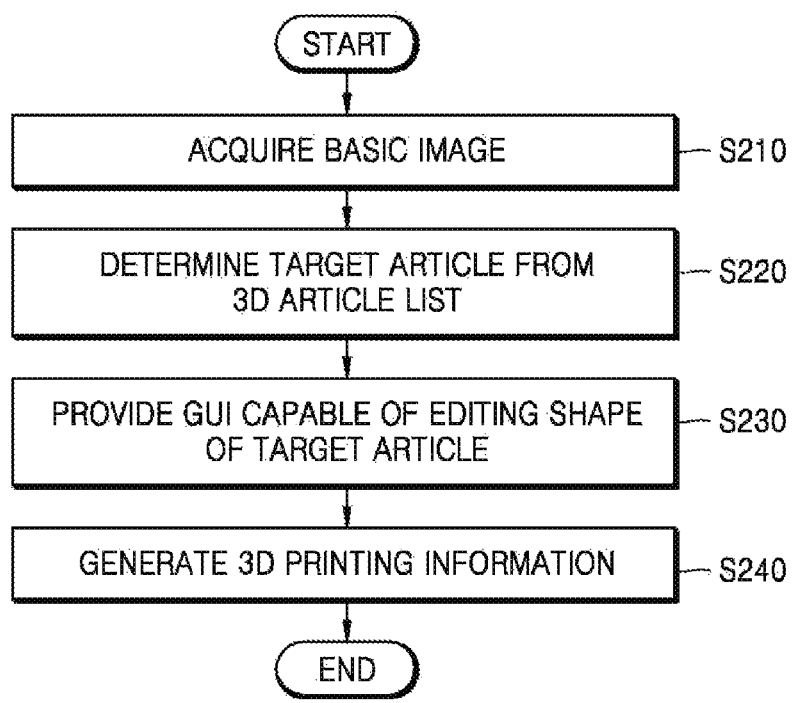
FIG. 2 is a flowchart of a method in which a device according to some embodiments generates 3D printing information.

FIG. 2 is a flowchart of a method in which the device 100 according to some embodiments generates 3D printing information.

In operation S210, the device 100 may acquire a basic image. According to an embodiment, the device 100 may acquire the basic image, based on a user input for acquiring an image.

For example, the device 100 may acquire the basic image via a user input acquired by performing a sketch via a touch on a screen where a touch input is possible. As another example, the device 100 may acquire the basic image by recognizing a sketching operation of a user. As another example, a desk image captured according to a user input of performing photography may be a basic image. As another example, a chair image downloaded from a server according to a user input may be a basic image. In operation S220, the device 100 may determine a target article. For example, the device 100 may determine a target article corresponding to the basic image acquired in operation S210 from the 3D article list stored in the device 100. The meaning of the target article corresponding to the basic image has already been described above with reference to FIG. 1.

The device 100 may use image parts when determining the target article. The image parts may mean a plurality of image parts into which an image is split. For example, when the basic image is a chair image, a chair back image, a seat image, and a chair leg image into which a chair image is split may be image parts for the basic image.

According to an embodiment, the device 100 may use the image parts of the basic image when determining the target article corresponding to the basic image from the 3D article list. For example, the device 100 may split the basic image into a plurality of image parts and an image of each of the 3D articles included in the 3D article list into a plurality of image parts according to a predetermined criterion and compare the image parts of the basic image with the image parts of each of the 3D articles, thereby determining the target article corresponding to the basic image. For example, when the device 100 acquires a first image and a second image by splitting the basic image, acquires a (1-1)th image and a (1-2)th image by splitting a first 3D article, and acquires a (2-1)th image and a (2-2)th image by splitting a second 3D article, the device 100 may compare the first image with the (1-1)th image, the second image with the (1-2)th image, the first image with the (2-1)th image, and the second image with the (2-2)th image and thus may determine the target article corresponding to the basic image from among the first 3D article and the second 3D article.

According to another embodiment, the device 100 may provide a selection menu for selecting an image corresponding to the basic image from the images of the 3D articles included in the 3D article list. For example, the device 100 may display a predetermined number of images that are similar to the basic image from among the images of the 3D articles included in the 3D article list. Similarities between the images of the 3D articles and the basic image may be determined according to a predetermined manner. For example, the device 100 may determine similarities between the images of the 3D articles and the basic image, by using the above-described image parts.

According to an embodiment, the device 100 may receive a selection input with respect to one of the displayed images of the 3D articles and determine the selected 3D article image as an image of the target article.

The basic image and the image of the target article may share similar features.

In operation S230, the device 100 may provide a GUI capable of editing the shape of the target article. According to an embodiment, the device 100 may provide a GUI capable of editing the shape of the target article according to a user input.

According to another embodiment, the GUI of the device 100 may provide an edition menu for editing a specific part of the basic image. The shape of the target article may be edited based on a user input via the GUI.

According to another embodiment, the device 100 may provide a recommendation list of constituent articles that are compatible with the constituent articles included in the target article. For example, when the target article is a chair, the device 100 may provide a recommendation list of a chair back which is a constituent article included in the chair. In this case, a chair back from among a plurality of displayed back chairs may be determined based on a user input. For example, a chair back image from among a plurality of displayed chair back images may be selected according to a selection input of a user.

The device 100 may provide the recommendation list according to a predetermined criterion. For example, the device 100 may provide the recommendation list of compatible constituent articles, based on stability of the target article edited by the constituent articles included in the recommendation list. The target article edited by the constituent articles included in the recommendation list may mean a target article that has been edited to include one of the constituent articles included in the recommendation list as a component of the target article. For example, when the target article is a chair, the edited target article may mean a chair of which legs are replaced with legs included in the recommendation list.

Stability of an article according to an embodiment may mean a value representing a degree to which the shape or location of the article is maintained without being deformed when an external force is applied to the article.

When a constituent article included in the recommendation list is used as a constituent article of the target article, stability of the target article may be maintained to a predetermined reference or greater. For example when the device 100 provides a recommendation list for wooden legs which are a constituent article of an office chair, which is a target article, the device 100 may include only wooden legs of which stability is equal to or greater than a predetermined reference when being used in the office chair, which is the target article, in the recommendation list. Stability of the office chair edited by wooden legs included in the recommendation list may be maintained to a predetermined reference or greater. The office chair edited by the wooden legs included in the recommendation list may mean an office chair including, as a constituent article, wooden legs included in the recommendation list. Stability of an edited target article according to an embodiment may be determined based on at least one of a location of the center of gravity of the target article edited by a constituent article included in a recommendation list and an internal structure of the target article. For example, a height of the center of gravity of a desk edited by a chair back included in a recommendation list may serve as a criterion for determining the stability of the edited desk. As another example, a structure of an edited desk, such as the area of the ground that contacts the edited desk, or the number of spots where the edited desk and the ground contact, may be used as a criterion for determining the stability of the edited desk.

According to another embodiment, the device 100 may provide a recommendation list of compatible constituent articles, based on the prices of the compatible constituent articles. For example, when the conditions of constituent articles other than the price are the same, the device 100 may provide, as a recommendation list, constituent articles of which prices are less than or equal to a predetermined reference. As another example, the device 100 may include, in the recommendation list, constituent articles of which prices are less than or equal to a predetermined reference or constituent articles of which prices are equal to or greater than a predetermined reference, based on a user input.

According to another embodiment, the device 100 may provide a recommendation list of compatible constituent articles, based on the sizes of the compatible constituent articles. For example, when the target article is a desk and a constituent article included therein is a drawer attached to the desk, the device 100 may include, in a recommendation list, only drawers of which sizes are compatible with the size of the drawer of the desk which is the target article.

According to another embodiment, the device 100 may provide a recommendation list of compatible constituent articles, based on a connection relationship between the target article and each constituent article included in the target article. For example, the device 100 may include only constituent articles connectable to the chair, which is the target article, in a recommendation list. Constituent articles unable to be connected with the target article may be excluded from the recommendation list. For example, when the target article is a chair to which only wooden legs are connectable, only wooden leg types may be included in the recommendation list of constituent articles.

According to another embodiment, the device 100 may provide an image representing an operation of a constituent article included in the target article according to the function of the target article.

For example, the device 100 may provide an image representing an opening or closing operation of the drawer of a desk, which is a target article. As another example, the device 100 may provide an image representing a tilting operation of the back of a chair, which is a target article.

According to an embodiment, the device 100 may edit the shape of the target article, based on a user input via the GUI. For example, the device 100 may replace a constituent article included in the target article, based on a user input. As another example, the device 100 may change the color of the target article.

A detailed editing method will be described later with reference to FIGS. 7-17B.

In operation S240, the device 100 may generate the 3D printing information. According to an embodiment, the device 100 may edit the shape of the target article, based on a user input via the GUI provided in operation S230, and may generate printing information used to 3D print the edited target article.

According to an embodiment, the device 100 may generate printing information used to 3D print the edited target article. A 3D printer connected to the device 100 may 3D print the edited target article by using the printing information acquired by the device 100. The device 100 may generate printing information that is necessary for performing 3D printing on the edited target article. The device 100 may transmit the generated printing information to the 3D printer.

According to an embodiment, the device 100 may generate manual information representing a method of assembling the edited target article. For example, the device 100 may provide the manual information in the form of at least one of a text and an animation.

Figure 3:
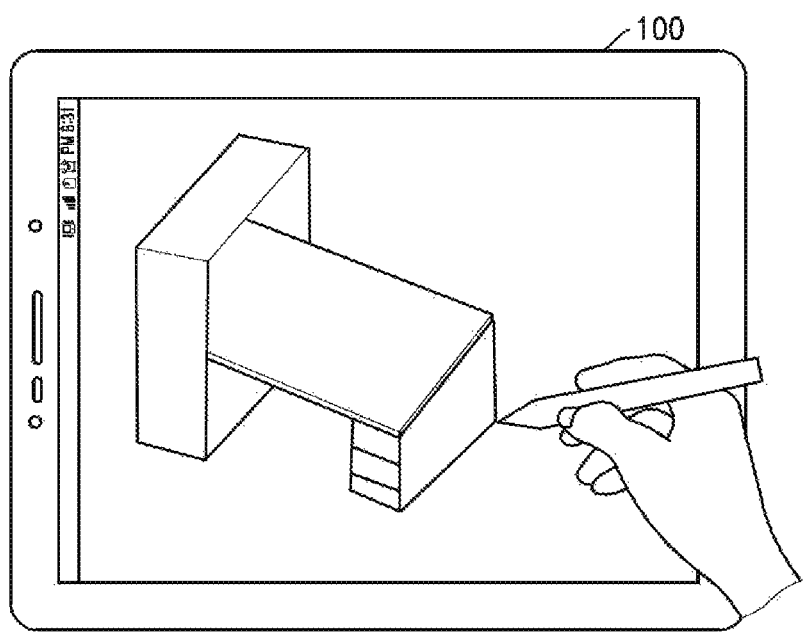
FIG. 3 illustrates an example in which a device according to some embodiments acquires an image.

FIG. 3 illustrates an example in which the device 100 according to some embodiments acquires an image.

According to an embodiment, the device 100 may acquire a basic image, based on a touch input made on a screen of the device 100. For example, when a user makes a sketch on a screen on which a touch input is possible, the device 100 may determine an image drawn via a received touch input as the basic image. As another example, the device 100 may determine an image acquired via a sketch input as the basic image. A sketch input according to an embodiment may denote an input obtained by a user making a sketch via a touch on a screen where a touch input is possible. A sketch input according to another embodiment may denote an input obtained by the device 100 recognizing a sketching operation of a user.

The basic image may be a two-dimensional (2D) image or a 3D image. For example, the device 100 may recognize a sketch input of the user as a 3D image and acquire the 3D image as the basic image.

According to another embodiment, the device 100 may acquire the basic image via photography.

For example, when a specific area within a captured image is selected by the user, the selected image area may be determined as the basic image.

As another example, when the same object is photographed at different angles several times, a plurality of 3D images may be acquired from the photographed object and may be determined as the basic image.

When the same object is photographed at different angles several times, the device 100 may provide a description of photographing directions. For example, the device 100 may provide a description that guides photography in 6 directions or a description that proposes panoramic photography.

According to another embodiment, the device 100 may determine a captured image as the basic image. For example, the device 100 may determine an image obtained by photographing a furniture image found from the Internet, as the basic image. As another example, the device 100 may determine a furniture image, which is a part of a captured image, as the basic image.

According to another embodiment, the device 100 may determine an image downloaded from the Internet, as the basic image. For example, the device 100 may download an image via a search from the Internet and may use the downloaded image as the basic image.

According to another embodiment, the device 100 may edit the basic image. For example, the basic image may be edited according to a user input such as addition or deletion of a dot, a line, or a side, a change in the color of the basic image, or a change in the thickness of a line. According to an embodiment, the device 100 may provide an edition tool for editing an image.

Figure 4:
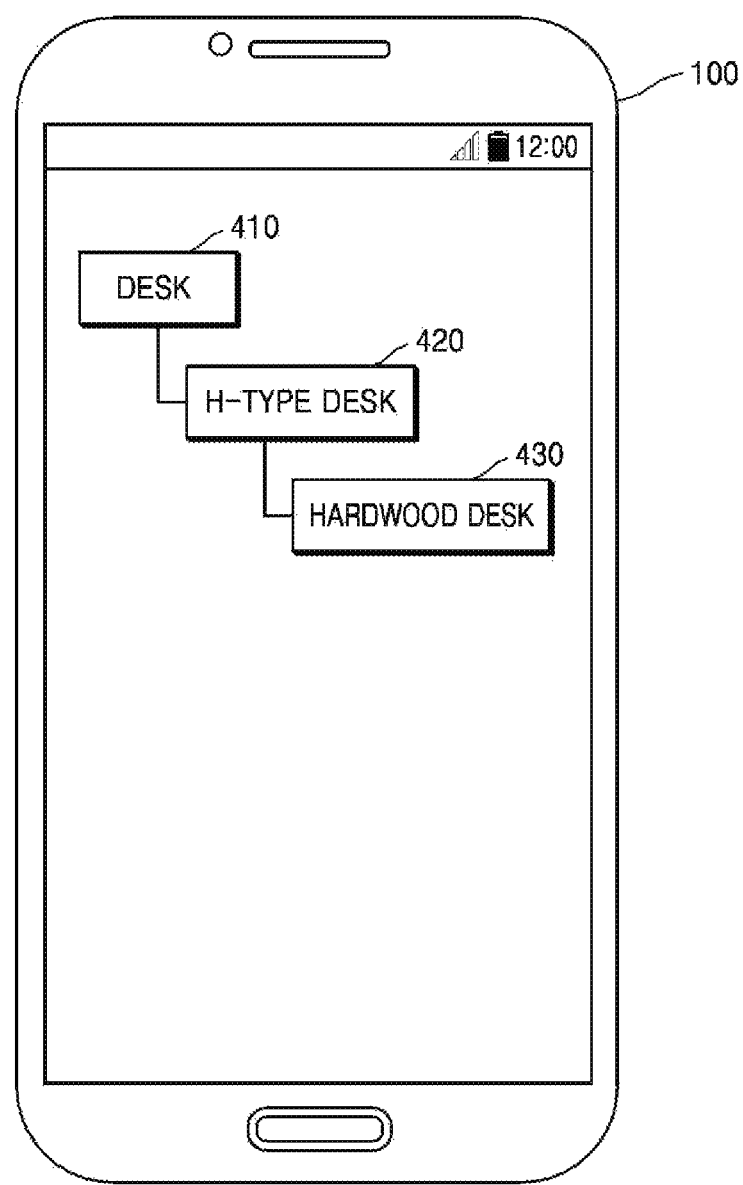
FIG. 4 illustrates an example in which a device according to some embodiments acquires an image from a server.

FIG. 4 illustrates an example in which the device 100 according to some embodiments acquires an image from a server.

According to an embodiment, the device 100 may acquire an image from the server. For example, the device 100 may provide images found using a keyword input by a user. One of the found and provided images may be determined as a basic image. A keyword according to an embodiment may be received according to categories. For example, a keyword input to a second search box may be limited to a subordinate word of a keyword that is input to a first search window. As another example, a keyword "desk" may be input to a first search box 410, a keyword "H-type desk", which is a type of desk, may be input to a second search box 420, and a keyword "hardwood desk", which is a type of H-type desk, may be input to a third search box 430. In this case, the device 100 may provide a result of a search for hardwood desks from among H-type desks. For example, the device 100 may acquire, from the server, frequently-searched images from among images of hardwood desks included in an H-type desk, and display the frequently-searched images on the screen of the device 100.

According to an embodiment, the device 100 may acquire and display at least one image of a target article corresponding to an input keyword.

According to an embodiment, a candidate image of the target article may denote at least one image determined according to a user input. For example, the candidate image of the target article may include an image that is similar to the basic image by a predetermined reference or greater from among images stored in the device 100. As another example, the candidate image of the target article may include a predetermined number of images from among images that satisfy conditions of keywords input by the device 100.

According to an embodiment, the device 100 may determine one of the displayed candidate images of the target article as an image of the target article that is to be edited, based on a user selection. The device 100 may provide a tool capable of editing the image of the target article determined based on the user selection, and a detailed editing method will be described later with reference to FIGS. 7-17B.

The number of input keywords may be previously determined. For example, the device 100 may receive a keyword and provide a result associated with the received keyword, or receive a plurality of keywords and provide a result associated with the received keywords.

The categories of input keywords may be previously determined. For example, when a keyword regarding furniture is input, the input keyword may include at least one of a furniture name, a furniture type, a furniture material, and a thickness of a plywood that forms the furniture.

According to an embodiment, the device 100 may search for and acquire an image of a target article that satisfies the input keyword. The device 100 may acquire, from the server, information about the target article that satisfies the input keyword.

According to another embodiment, the device 100 may search for and acquire an image of a target article by using both a keyword and a voice. For example, the device 100 may recognize a voice of a user via a user input, and display a search result that satisfies a condition corresponding to the recognized voice of the user. The search result may include candidate images of the target article.

According to another embodiment, the device 100 may search for not only the target article but also the constituent articles included in the target article. For example, when the target article is a chair, the device 100 may search for a sitting mat that is not included in the constituent articles of the chair.

Figure 5:
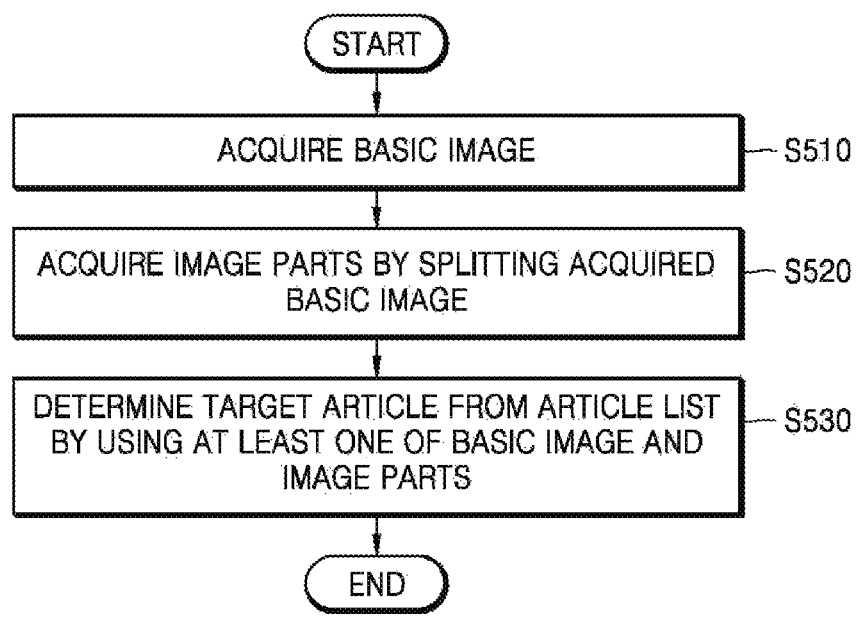
FIG. 5 is a flowchart of an example in which a device according to some embodiments determines a target article.

FIG. 5 is a flowchart of an example in which the device 100 according to some embodiments determines a target article.

In operation S510, the device 100 may acquire a basic image. Since operation S510 corresponds to the above-described operation S210, a detailed description thereof will be omitted herein.

In operation S520, the device 100 may acquire image parts by splitting the basic image acquired in operation S510. Image parts according to an embodiment may mean a plurality of image parts into which the basic image is split.

When the device 100 acquires the image parts by splitting the basic image, a predetermined criterion may be used. A criterion used to acquire the image parts may be previously determined according to the types of article included in the basic image. For example, when an article included in the basic image is recognized as a chair, the chair may be previously determined to be split into a chair back part, a seat part, and a leg part. As another example, when the article included in the basic image is a bed, the device 100 may acquire, as the image parts, a mattress part and the other part into which a bed image is split. As another example, the device 100 may acquire image parts for each of constituent articles into which each article is splittable.

In operation S530, the device 100 may determine a target article from an article list by using at least one of the basic image acquired in operation S510 and the image parts acquired in operation S520.

According to an embodiment, the device 100 may determine an image that is the most similar to the basic image from among the images stored in the device 100, according to a predetermined manner.

For example, the device 100 may compare the image parts of the basic image with the image parts of each of the images stored in the device 100 and thus determine an image corresponding to the basic image from among the images stored in the device 100.

As another example, the device 100 may determine a target article having the most similar shape to that of an article included in the basic image, from the 3D article list stored in the device 100, and provide information about the determined target article.

Figure 6:
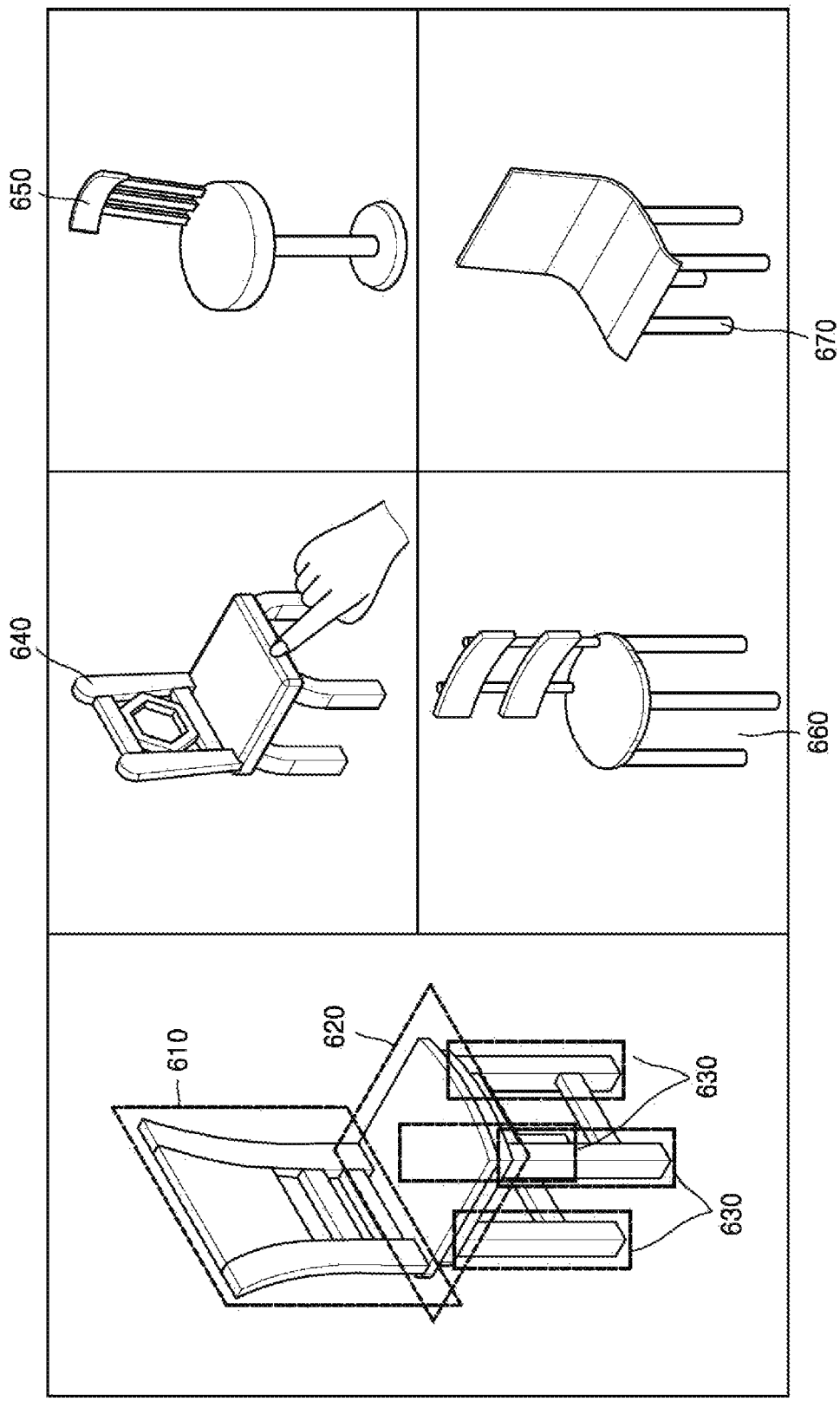
FIG. 6 illustrates an example in which a device according to some embodiments searches for a target article by using a partial image.

FIG. 6 illustrates an example in which the device 100 according to some embodiments searches for a target article by using a partial image.

According to an embodiment, a basic image may be comprised of a plurality of image parts. For example, when the target article is a chair, the basic image may include an image of a back part 610, an image of a seat part 620, and an image of a leg part 630. The image of the back part 610, the image of the seat part 620, and the image of the leg part 630 may be referred to as image parts of the basic image.

According to an embodiment, the device 100 may split an image of the target article into a plurality of image parts according to a user input. For example, when the target article is a chair, the device 100 may split the image of the basic image into the image of the back part 610, the image of the seat part 620, and the image of the leg part 630 according to a user input.

According to another embodiment, the device 100 may split the image of the target article into a plurality of image parts by using a predetermined method according to the type of the target article without a user input. For example, when the target article is a chair, the image of the target article may be previously determined to be split into the image of the back part 610, the image of the seat part 620, and the image of the leg part 630.

According to an embodiment, the device 100 may store a plurality of images. Alternatively, the device 100 may acquire a plurality of images from a server and store the acquired plurality of images. The device 100 may also store information about a plurality of articles.

According to an embodiment, the device 100 may determine an article corresponding to the basic image. For example, the device 100 may display a predetermined number of images for articles having similar shapes to the basic image.

According to an embodiment, the device 100 may provide images 640, 650, 660, and 670 of some articles from a 3D article list by using the image parts 610, 620, and 630 of the basic image. According to a user input, one may be selected from the plurality of images. The device 100 may determine a selected image 640 as an image of the target article.

According to another embodiment, the device 100 may select one from among the plurality of images 640, 650, 660, and 670 without a user input.

Figure 7:
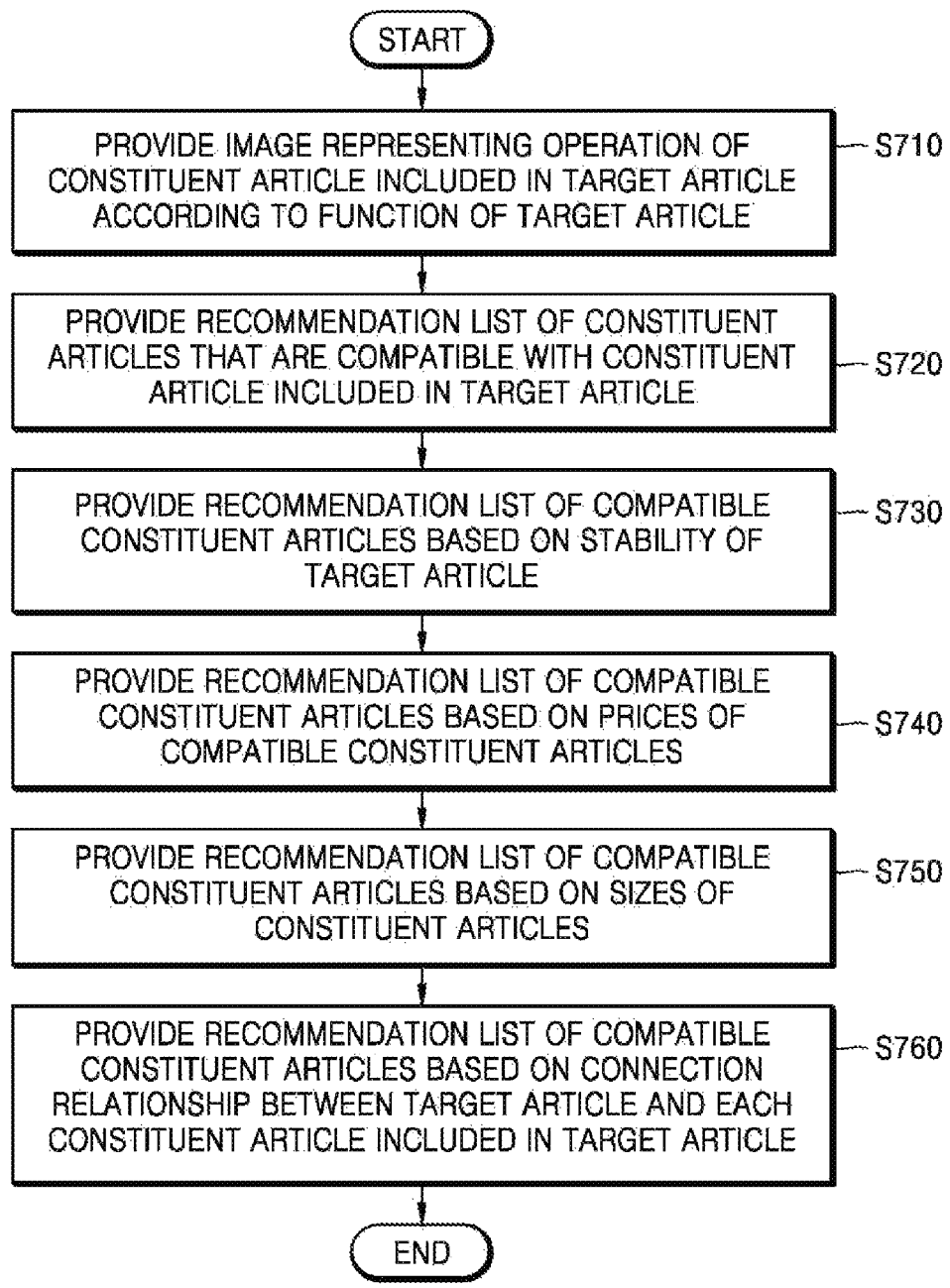
FIG. 7 is a flowchart of a method in which a device according to some embodiments provides a graphical user interface (GUI)

FIG. 7 is a flowchart of a method in which the device 100 according to some embodiments provides a GUI.

In operation S710, the device 100 may provide an image representing an operation of a constituent article included in a target article according to the function of the target article.

The constituent article included in the target article may operate according to the function of the target article. For example, the back of a chair which is the target article may be tilt at a predetermined angle. As another example, a drawer which is a constituent article of a desk which is the target article may be repeatedly closed and open.

When a constituent article included in the target article operates according to the function of the target article, the device 100 may provide an image representing the operation of the constituent article. For example, when a desk is the target article, the device 100 may provide an image for a case where the drawer of the desk is opened and an image for a case where the drawer of the desk is closed. As another example, when a desk is the target article, the device 100 may provide an opening operation of the drawer of the desk in the form of an animation. As another example, when furniture is the target article, the device 100 may provide an opening or closing operation of the door of the furniture in the form of an animation.

In operation S720, the device 100 may provide a recommendation list of constituent articles that are compatible with the constituent article included in the target article.

For example, when a desk is the target article, the device 100 may display images of drawers that may be attached to the desk, which is the target article.

As another example, when a rocking chair is the target article, the device 100 may display chair back images that are compatible with the rocking chair, which is the target article, and are exposed on the Internet by a predetermined reference number of times.

A detailed recommendation list providing method will be described later with reference to FIG. 8.

In operation S730, the device 100 may provide a recommendation list of compatible constituent articles based on the stability of the target article.

Stability according to an embodiment may mean a value representing a degree to which a current shape or location of an article is maintained without being deformed when an external force is applied to the article. Stability according to an embodiment may be determined based on at least one of a location of the center of gravity of the target article edited by a constituent article included in the recommendation list and an internal structure of the target article. For example, a height of the center of gravity of a desk edited by a chair back included in a recommendation list may serve as a criterion for determining the stability of the edited desk. As another example, a structure of an edited desk, such as the area of the ground that contacts the edited desk, or the number of spots where the edited desk and the ground contact, may be used as a criterion for determining the stability of the edited desk.

According to an embodiment, when the height of the center of gravity of the target article is a criterion for determining the stability of the target article, the height of the center of gravity of the target article may be inversely proportional to the stability of the target article.

According to another embodiment, when the area of the ground that contacts the target article is a criterion for determining the stability of the target article, the area of the ground that contacts the target article may be proportional to the stability of the target article.

In operation S740, the device 100 may provide a recommendation list of compatible constituent articles, based on the prices of the compatible constituent articles.

For example, when the conditions of constituent articles other than the price are the same, the device 100 may provide, as a recommendation list, constituent articles of which prices are less than or equal to a predetermined reference. As another example, the device 100 may include, in the recommendation list, constituent articles of which prices are less than or equal to a predetermined reference or constituent articles of which prices are equal to or greater than a predetermined reference, based on a user input.

In operation S750, the device 100 may provide a recommendation list of compatible constituent articles, based on the sizes of the compatible constituent articles.

For example, when the target article is a desk and a constituent article included therein is a drawer attached to the desk, the device 100 may include, in recommendation list, only drawers that are suitable for the size of the drawer of the desk, which is the target article.

In operation S760, the device 100 may provide a recommendation list of compatible constituent articles, based on a connection relationship between the target article and each constituent article included in the target article.

For example, the device 100 may include only constituent articles compatible with the chair as the target article, in the recommendation list. Constituent articles incompatible with the target article may be excluded from the recommendation list.

Figure 8:
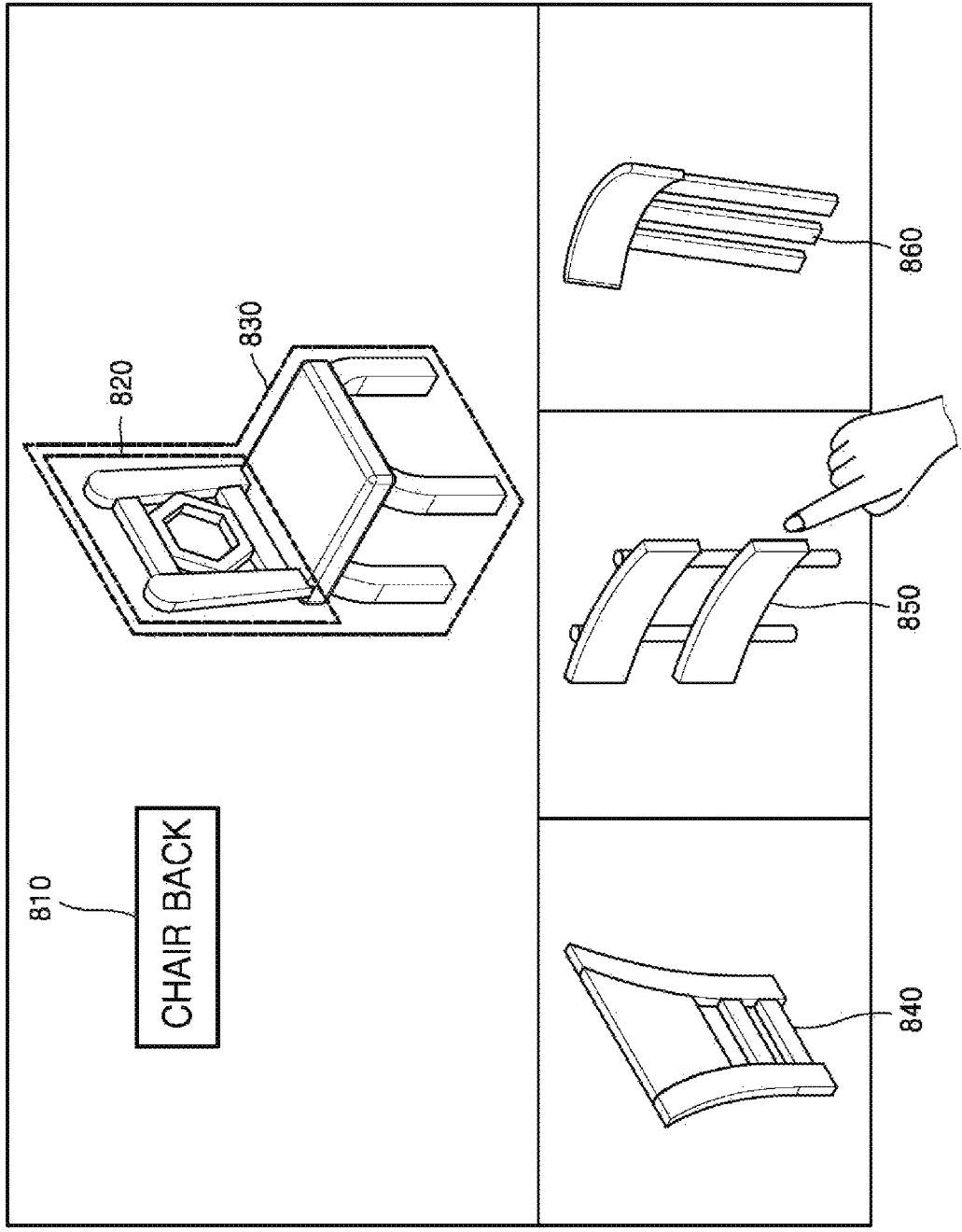
FIG. 8 illustrates an example in which a device according to some embodiments searches for component articles.

FIG. 8 illustrates an example in which the device 100 according to some embodiments searches for constituent articles.

According to an embodiment, the device 100 may determine a target article, based on a user input such as a sketch input or a keyword input. The device 100 may display at least one candidate image of the target article that is determined based on a sketch input or keyword input of a user from among images of the determined target article. According to an embodiment, an image 830 of the target article may be determined from among the at least one candidate image of the target article, based on a selection input of the user. According to another embodiment, the device 100 may determine the image 830 of the target article as an image that is the most similar to a basic image from among the at least one candidate image of the target article.

The image 830 of the target article may be edited based on a user input. FIG. 8 describes a method of editing the image 830 of the target article.

According to an embodiment, the device 100 may provide a recommendation list of constituent articles that are compatible with the constituent articles included in the target article. According to an embodiment, when the target article is a chair, the device 100 may provide a recommendation list for a chair back which is a constituent article of the target article.

The device 100 may provide images of constituent articles found based on the name of a constituent article input to a search box 810, and provide images of constituent articles for an image part 820 selected from the image 830 of the target article.

The device 100 may determine images 840, 850, and 860 from among images for the constituent articles stored in the device 100 according to a predetermined criterion, and provide the determined images 840, 850, and 860. A user may select one from among the provided images 840, 850, and 860.

The device 100 may edit the image 830 of the target article by using the image 850 selected based on a user input such as a touch input. An image of an edited target article will be described later with reference to FIG. 10.

According to an embodiment, a keyword associated with the material, internal structure, or the like of a constituent article may be input to the search box 810. For example, a keyword, such as wood, which is a material of the constituent article, an empty structure, which is an internal structure of the constituent article, or a compact structure, which is an internal structure of the constituent article, may be input to the search box 810. In this case, the device 100 may provide an image for the constituent article formed of the material input to the search box 810. For example, when a keyword "wooden chair back" is input to the search box 810, the device 100 may display some of results of a search for a wooden chair back.

Figure 9:
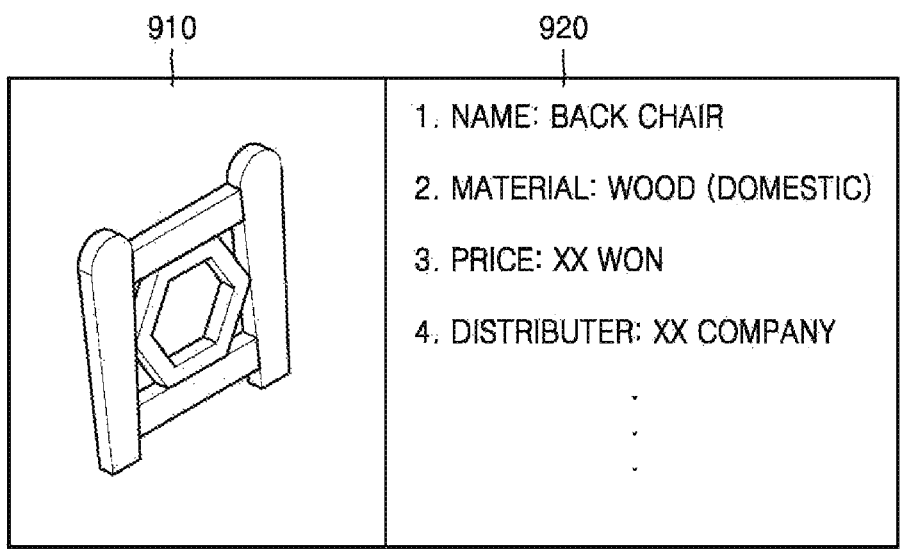
FIG. 9 illustrates an example in which a device according to some embodiments provides a description of a constituent article.

FIG. 9 illustrates an example in which the device 100 according to some embodiments provides a description of a constituent article.

The device 100 may provide information about constituent articles that constitute a target article. For example, when the back of a chair is determined as a constituent article, the device 100 may display an image of the chair back on a left screen 910 and a description of the chair back on a right screen 920. The description of the constituent article may include a name, a material, a price, a distributor, a weight, a size, and the like.

Figure 10:
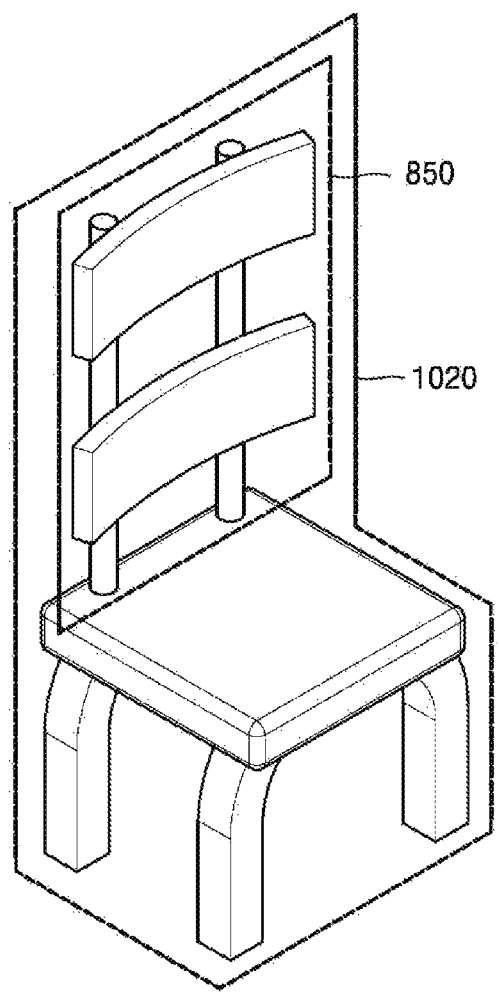
FIG. 10 illustrates an example in which a device according to some embodiments displays an image of an edited target article.

FIG. 10 illustrates an example in which the device 100 according to some embodiments displays an image 1020 of an edited target article.

Referring to FIGS. 8 and 10, the device 100 may obtain the image 1020 of the edited target article by editing the image 830 of the target article by using the image 850 of the constituent article determined based on a user input. The image 1020 of the edited target article may include the image 850 of the constituent article determined based on the user input. For example, when a chair is the target article, an image of the back of the chair may be changed by a user selection. In this case, the image 1020 of the edited target article having a changed chair back image may be displayed.

The image 1020 of the edited target article may be changed via an additional edition.

Figure 11:
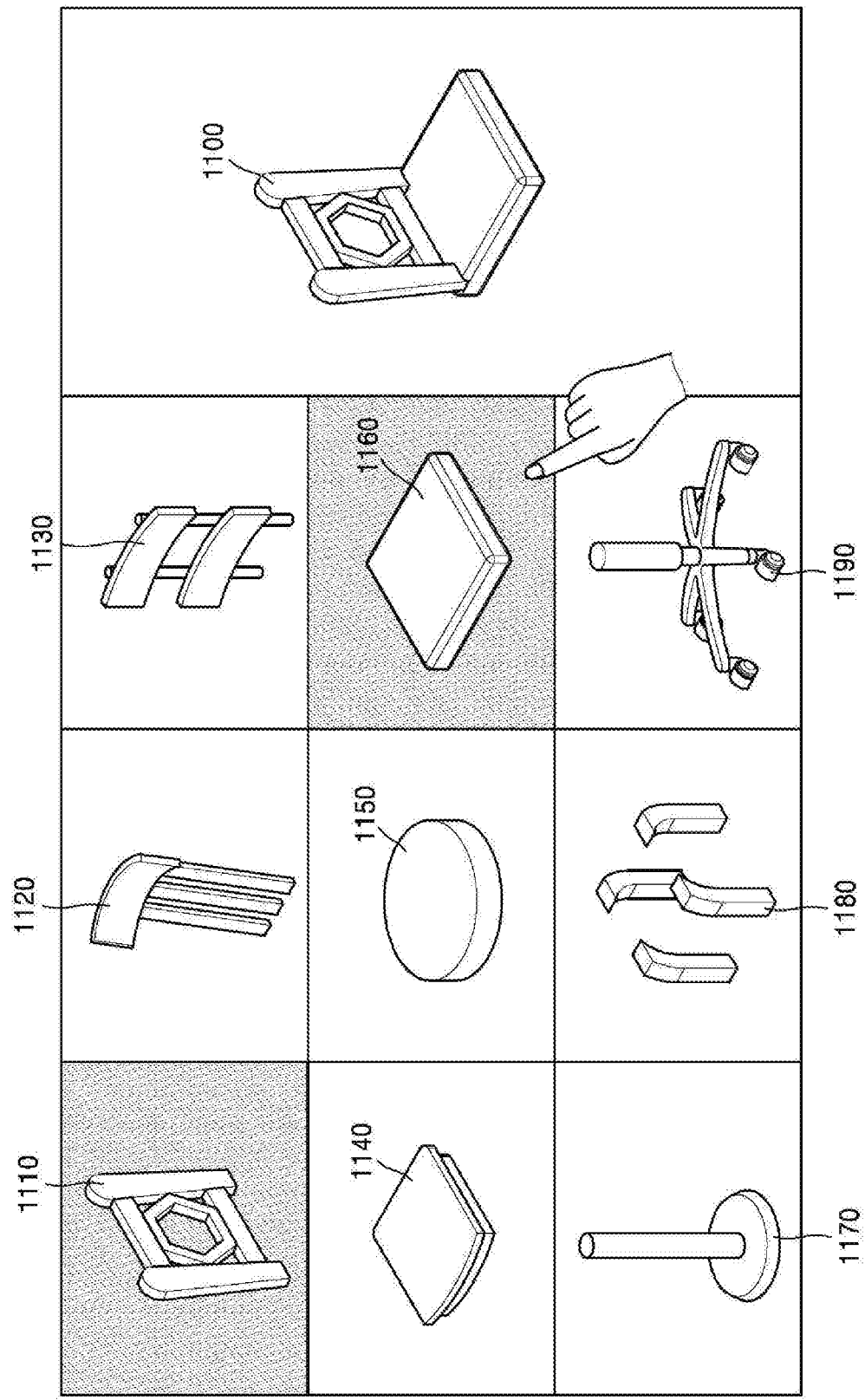
FIG. 11 illustrates an example in which a device according to some embodiments determines a target article by selecting a plurality of constituent articles.

FIG. 11 illustrates an example in which the device 100 according to some embodiments determines a target article by selecting a plurality of constituent articles.

The device 100 may display constituent articles that constitute a target article. For example, when the target article is a chair, the device 100 may display a recommendation list of chair backs on an upper portion of the screen of the device 100, a recommendation list of seats on a middle portion thereof, and a recommendation list of leg parts on a lower portion thereof. For example, images 1110, 1120, and 1130 of three chair backs, images 1140, 1150, and 1160 of three seats, and images 1170, 1180, and 1190 of three leg parts may be displayed.

The device 100 may receive a selection input with respect to displayed constituent article images. For example, a first constituent article image 1110 and a second constituent article image 1160 may be selected. In this case, an image 1100 of a currently-being-edited target article, which is a combination of the first constituent article image 1110 with the second constituent article image 1160, may be displayed. According to an embodiment, the device 100 may acquire the image 1100 of the currently-being-edited target article by using images of currently-selected constituent articles. Based on a user input of selecting the first constituent article image 1110 and the second constituent article image 1160, the device 100 may generate the image 1100 of the currently-being-edited target article.

Figure 12:
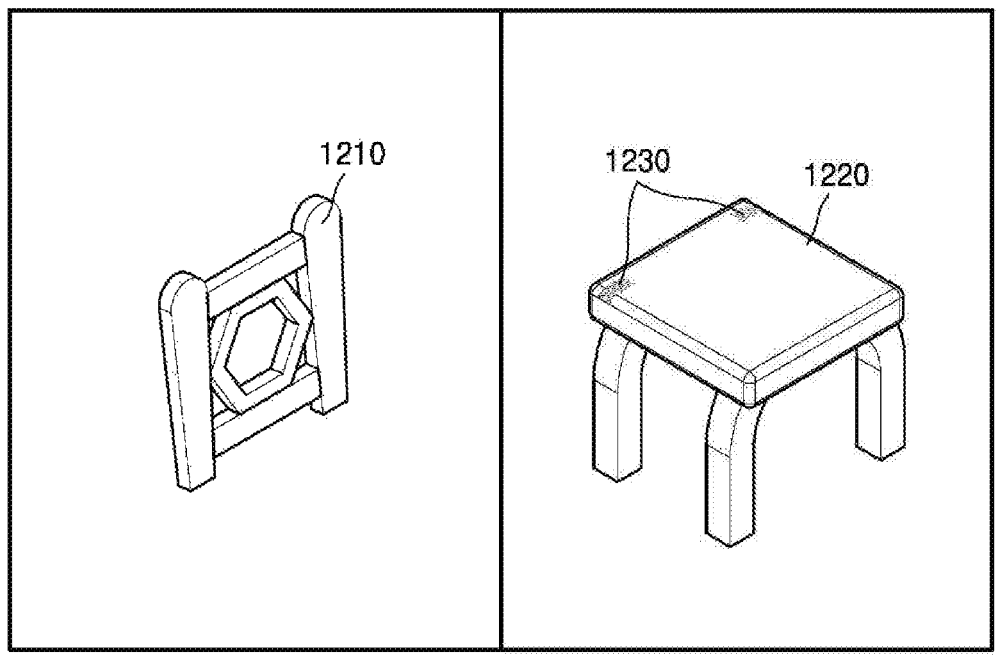
FIG. 12 illustrates an example in which a device according to some embodiments displays information about locations of joins between constituent articles.

FIG. 12 illustrates an example in which the device 100 according to some embodiments displays information about locations of joins between constituent articles.

According to an embodiment, the device 100 may store information about a connection between constituent articles and display the information.

For example, when a target article is a chair, the device 100 may store information about joins 1230 between a back part 1210 and a seat part 1220 that constitute an edited target article. The display 100 may display the joins 1230. In this case, the device 100 may visually deliver information about locations and areas of the joins 1230.

Figure 13:
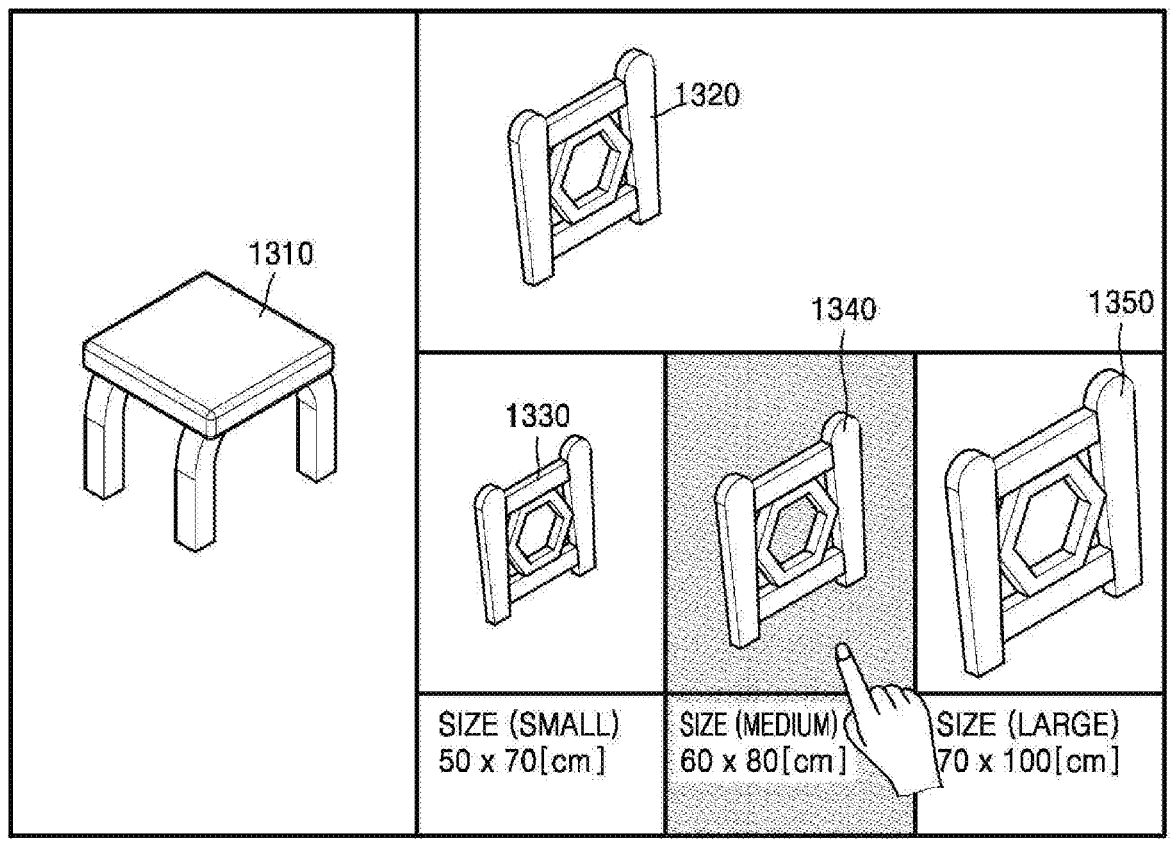
FIG. 13 illustrates an example in which a device according to some embodiments recommends a constituent article according to standards.

FIG. 13 illustrates an example in which the device 100 according to some embodiments recommends a constituent article according to standards.

The device 100 may display a constituent article 1320 desired to be changed and a constituent article 1310 not being changed from among constituent articles that constitute a target article. For example, a chair back 1320 may be changed. A recommendation list for the constituent article 1320 desired to be changed may be displayed. When the constituent article desired to be changed is a chair back, the device 100 according to an embodiment may display a small-size chair back 1330, a medium-size chair back 1340, and a large-size chair back 1350. According to an embodiment, the device 100 may indicate that the medium-size chair back 1340 is recommended from among the displayed chair backs 1330, 1340, and 1350. According to an embodiment, the device 100 may receive a selection input of selecting one image from among a plurality of displayed images.

Figure 14:
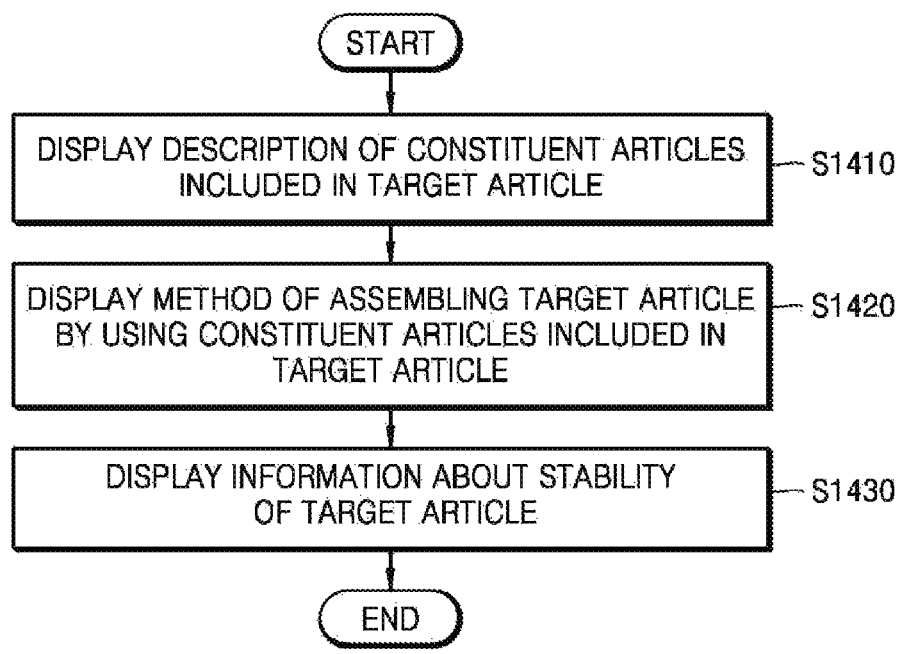
FIG. 14 is a flowchart of a method in which a device according to some embodiments displays information about stability of a target article.

FIG. 14 is a flowchart of a method in which the device 100 according to some embodiments displays information about stability of a target article.

In operation S1410, the device 100 may display a description of the constituent articles included in a target article.

Constituent articles according to an embodiment may denote articles that constitute a target article. According to an embodiment, the device 100 may provide information about each of the constituent articles that constitute the target article. For example, the device 100 may display, on the screen thereof, a description of each of the constituent articles included in the target article. A method of displaying a description of each constituent article has described above with reference to FIG. 9.

In operation S1420, the device 100 may display a method of assembling a target article by using constituent articles included in the target article.

An assembling method according to an embodiment may include an assembling sequence, a method of combining constituent articles with one another, and notes during assembly.

The assembling method according to an embodiment will be described later in detail with reference to FIGS. 15 and 16.

In operation S1430, the device 100 may display information about the stability of the target article.

Stability according to an embodiment may mean a value representing a degree to which a current shape or location of an article is maintained without being deformed when an external force is applied to the article. Stability according to an embodiment may be determined based on at least one of a location of the center of gravity of the target article edited by a constituent article included in the recommendation list and an internal structure of the target article. For example, a height of the center of gravity of a desk edited by a chair back included in a recommendation list may serve as a criterion for determining the stability of the edited desk. As another example, a structure of an edited desk, such as the area of the ground that contacts the edited desk, or the number of spots where the edited desk and the ground contact, may be used as a criterion for determining the stability of the edited desk.

An embodiment of displaying information about the stability of a target article will be described later with reference to FIG. 17.

Figure 15:
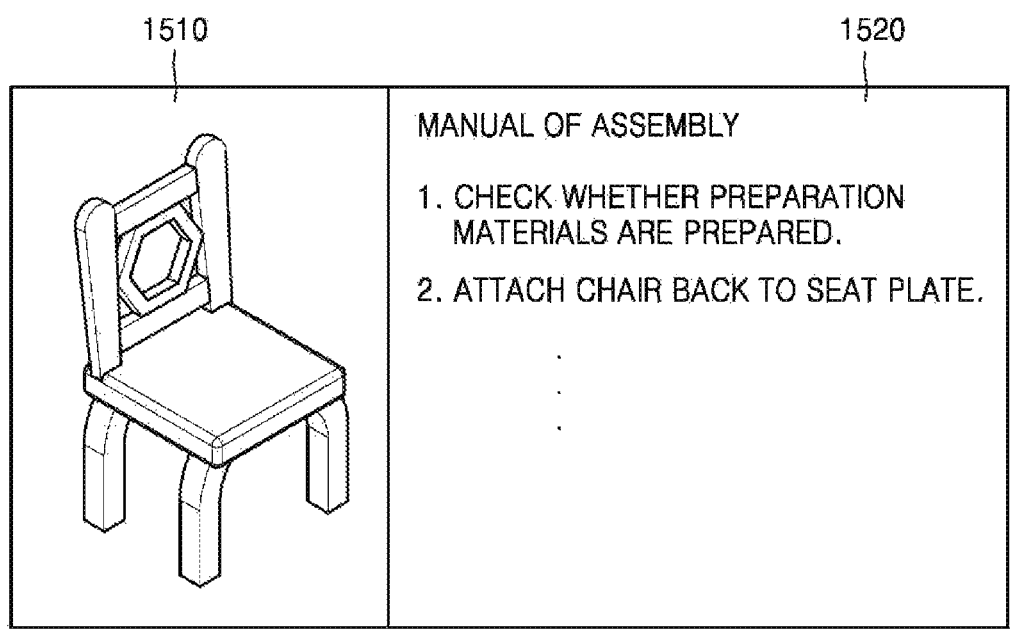
FIG. 15 illustrates an example in which a device according to some embodiments provides an assembling method.

FIG. 15 illustrates an example in which the device 100 according to some embodiments provides an assembling method.

According to an embodiment, the device 100 may display an image of a target article on a left screen 1510 and may display on a right screen 1520 a method of assembling the target article.

For example, the device 100 may provide a description of the assembling method via the right screen 1520. According to an embodiment, the device 100 may display a manual that explains the method of assembling the target article by using constituent articles.

Figure 16:
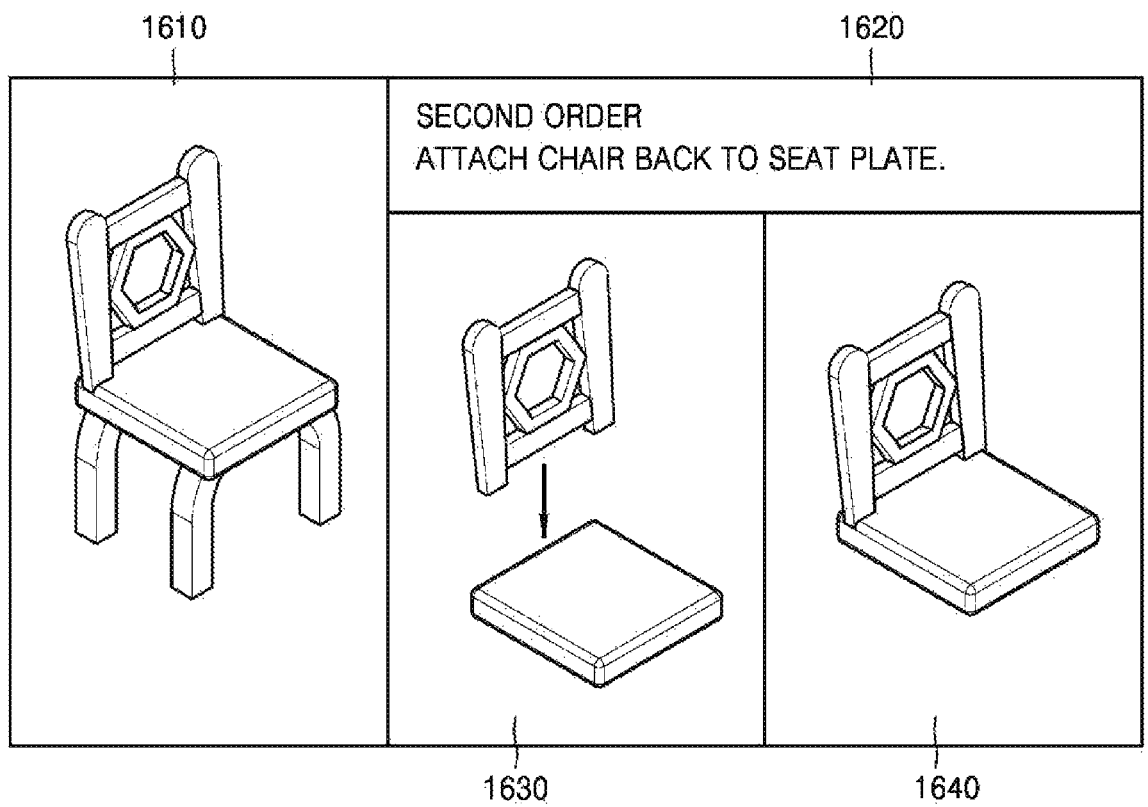
FIG. 16 illustrates an example in which a device according to some embodiments provides an assembling method.

FIG. 16 illustrates an example in which the device 100 according to some embodiments provides an assembling method.

According to an embodiment, the device 100 may display an image of a target article on a left screen 1610 and may display on a right screen 1620 a method of assembling the target article.

For example, the device 100 may provide an image or animation of the assembling method via the right screen 1620.

According to an embodiment, the device 100 may display an image or animation that sequentially explains the method of assembling the target article by using constituent articles. For example, when the target article is a chair, the device 100 according to an embodiment may describe a method of attaching a chair back to a seating plate by using an image or animation.

Figure 17A:
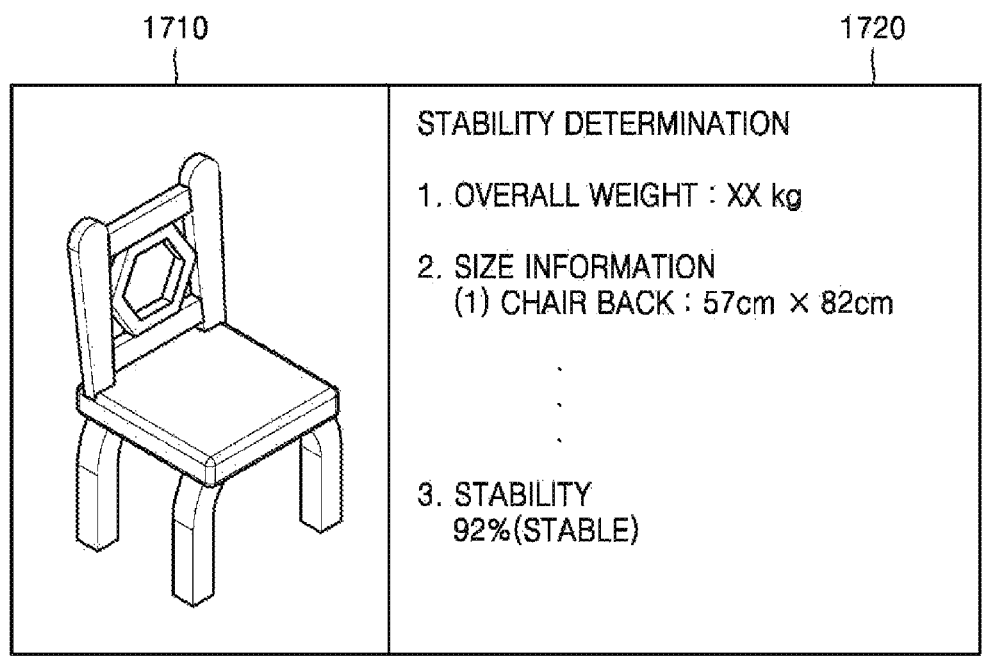
FIG. 17A illustrates an example in which a device 100 according to some embodiments provides information about the stability of a target article.

FIG. 17A illustrates an example in which the device 100 according to some embodiments provides information about the stability of a target article.

According to an embodiment, the device 100 may display an image of the target article on a left screen 1710 and may display information about the stability on a right screen 1720.

According to an embodiment, the device 100 may display, on the right screen 1720, information about the stability of the target article displayed on the left screen 1710. For example, the right screen 1720 may display at least one of information about a weight of the target article, information about the size of the target article, information about the stability of the target article, and information about a location of the center of gravity of the target article.

For example, in FIG. 17A, the target article is a chair with four legs, and the stability of the target article is 92%.

Figure 17B:
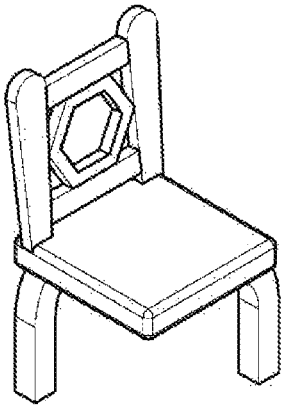
FIG. 17B illustrates an example in which a device according to some embodiments provides information about the stability of a target article.

FIG. 17B illustrates an example in which the device 100 according to some embodiments provides information about the stability of a target article.

According to an embodiment, the device 100 may display an image of the target article on a left screen 1730 and may display information about the stability on a right screen 1740.

According to an embodiment, the device 100 may display, on the right screen 1730, information about the stability of the target article displayed on the left screen 1740. For example, the right screen 1740 may display at least one of information about a weight of the target article, information about the size of the target article, information about the stability of the target article, and information about a location of the center of gravity of the target article.

For example, in FIG. 17B, the target article is a chair with three legs, and the stability of the target article is 12%. In this case, the device 100 shows that the target article is not stable.

Figure 18:
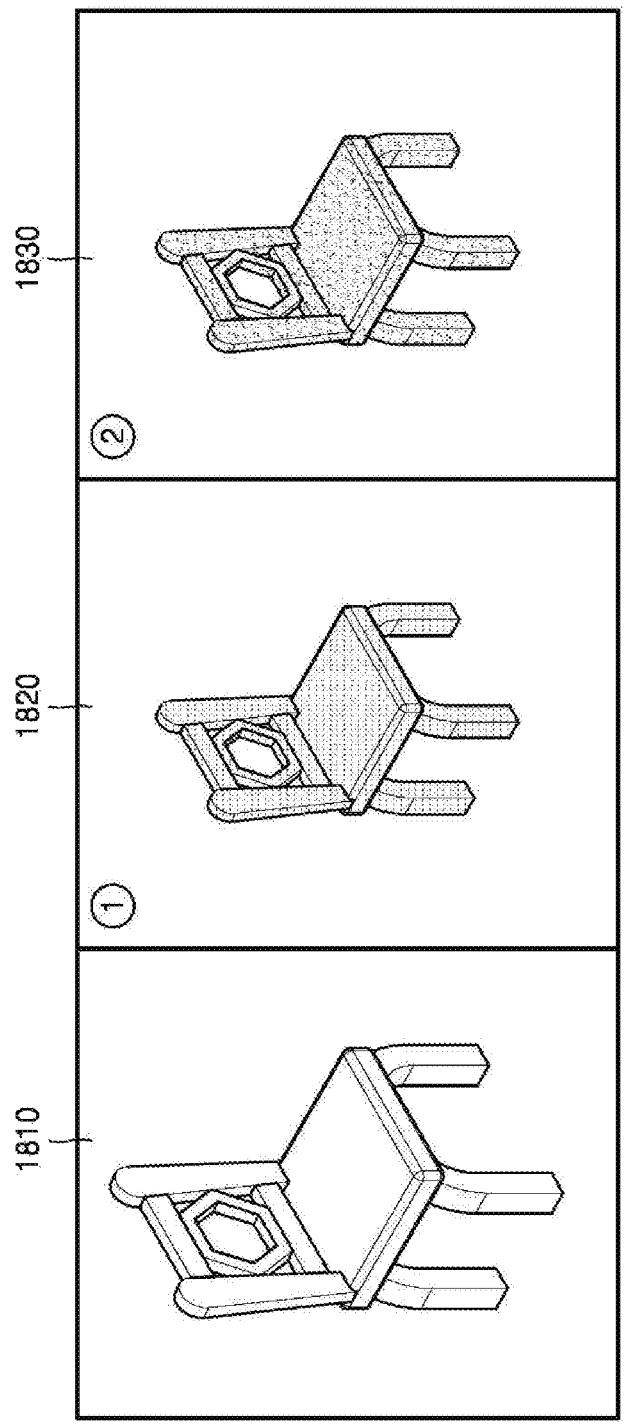
FIG. 18 illustrates an example in which a device according to some embodiments provides options for a target article.

FIG. 18 illustrates an example in which the device 100 according to some embodiments provides options for a target article.

The device 100 may provide images 1820 and 1830 obtained by changing the color of an image 1810 of the target article. For example, the device 100 may display the images 1820 and 1830 having the same shapes as the target article but having different colors from the target article. In this case, the colors of the images 1820 and 1830 displayed as a recommendation list may be colors that are used a predetermined reference number of times or more.

Figure 19:
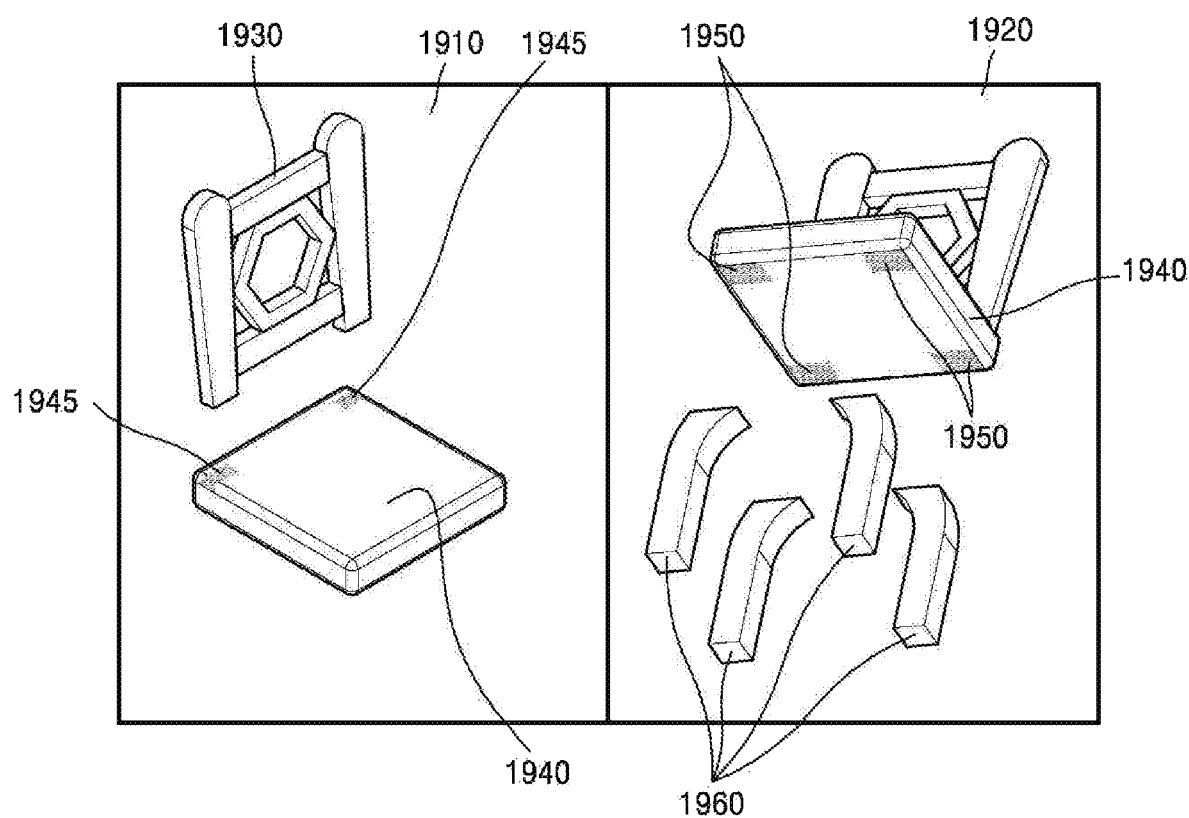
FIG. 19 illustrates an example in which a device according to some embodiments provides information about joins between constituent articles.

FIG. 19 illustrates an example in which the device 100 according to some embodiments provides information about joins between constituent articles.

According to an embodiment, the device 100 may provide the information about joins between constituent articles. For example, when a target article is a chair, the device 100 may display joins 1945 between a chair back 1930 and a seat 1940 on a left screen 1910. As another example, the device 100 may display joins 1950 between the seat 1940 and legs 1960 on a right screen 1920.

FIG. 20 illustrates an example in which the device 100 according to some embodiments provides information about constituent articles.

According to an embodiment, when a target article is a chair, the device 100 may provide information about a chair back part, a seat part, and a leg part which are constituent articles of a target article.

For example, the device 100 may display a chair back image on a left upper portion of the screen of the device 100 and may display information about a chair back on a right upper portion of the screen. The information about the chair back may include at least one of a weight of the chair back, a size thereof, a material thereof, and a price thereof.

As another example, the device 100 may display an image of a seat part on a left middle portion 2020 of the screen and may display information about the seat part on a right middle portion 2050 of the screen. The information about the seat part may include at least one of a weight of the seat part, a size thereof, a material thereof, and a price thereof.

As another example, the device 100 may display an image of a chair leg part on a left lower portion 2030 of the screen and may display information about the chair leg part on a right lower portion 2060 of the screen. The information about the chair leg part may include at least one of a weight of the chair leg part, a size thereof, a material thereof, and a price thereof.

Figure 21:
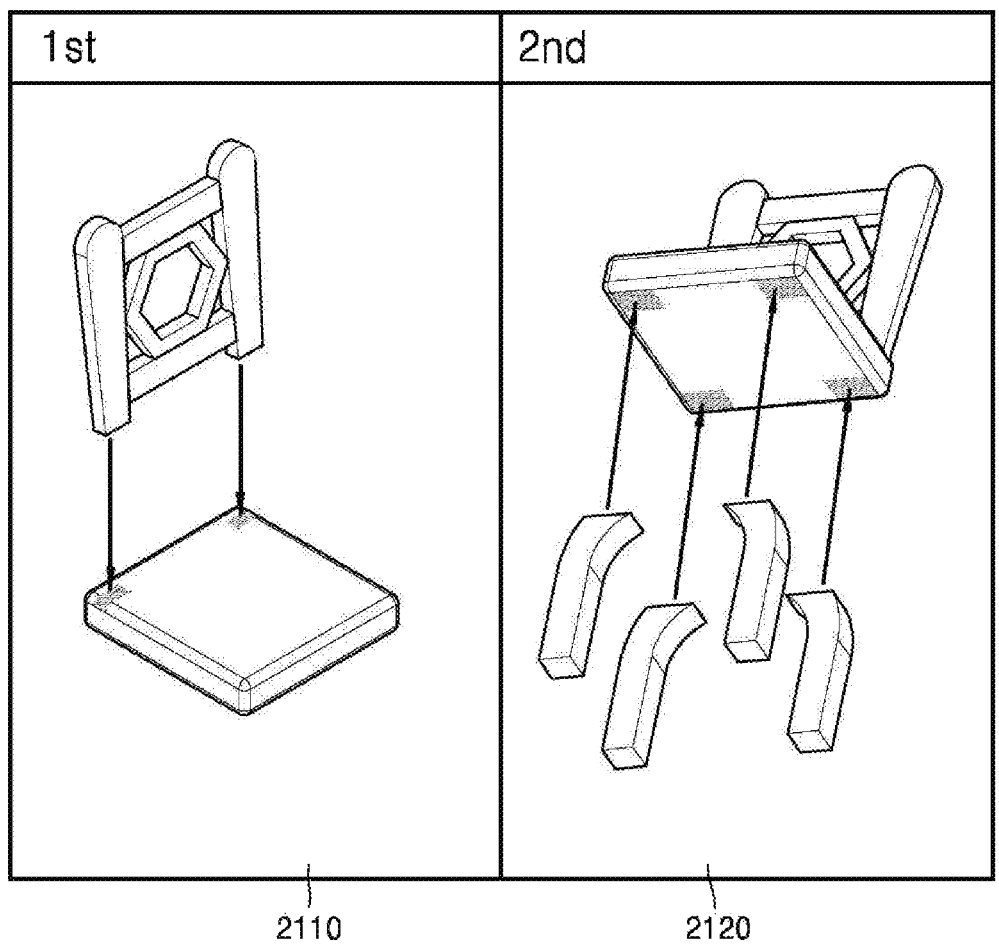
FIG. 21 illustrates an example in which a device according to some embodiments provides a method of assembling constituent articles.

FIG. 21 illustrates an example in which the device 100 according to some embodiments provides a method of assembling constituent articles.

A method in which the device 100 displays joins between constituent articles, according to an embodiment, has been described above with reference to FIG. 19.

A method in which the device 100 displays joins between constituent articles, according to another embodiment, will now be described with reference to FIG. 21. A target article according to an embodiment may be a chair.

For example, the device 100 may provide a method of assembling a chair back part and a seat part which are constituent articles, on a left screen 2110. The assembling method may be provided in the form of an image or animation.

As another example, the device 100 may provide a method of assembling a seat part and a chair leg part which are constituent articles, on a right screen 2120. The assembling method may be provided in the form of an image or animation.

Figure 22:
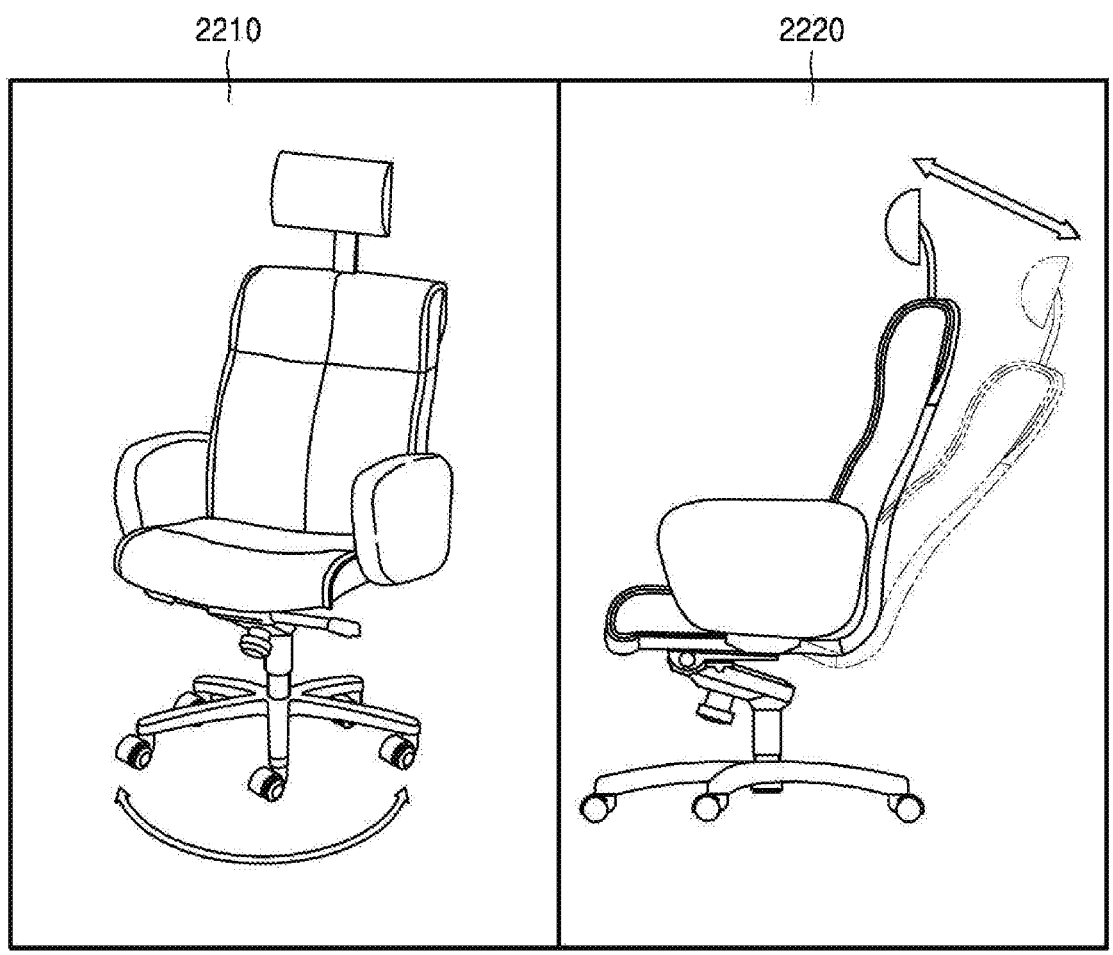
FIG. 22 illustrates an example in which a device according to some embodiments provides information about operations of constituent articles that constitute a target article.

FIG. 22 illustrates an example in which the device 100 according to some embodiments provides information about operations of constituent articles that constitute a target article.

The constituent articles that constitute the target article may operate according to the functions of the constituent articles. For example, when the target article is a piece of furniture, a drawer which is a constituent article of the furniture may be opened or closed.

According to an embodiment, when the target article is a chair, the device 100 may display operations of the constituent articles of the target article. According to an embodiment, the device 100 may display operable ranges of the constituent articles.

For example, the device 100 may display, on a left screen 2210, an image or animation representing that a wheel part of the chair, which is the target article, is turning.

As another example, the device 100 may display, on a right screen 2220, an image or animation representing that a back part of the chair, which is the target article, is tilt. According to an embodiment, the device 100 may also display a tiltable angle of the back part, when displaying tilting of the back part.

FIG. 23 is a block diagram of a structure of the device 100 according to some embodiments.

Referring to FIG. 23, the device 100 may include an input unit 2310, a database (DB) 2320, a controller 2330, a display 2340, and a communicator 2350.

The device 100 may be implemented by more or less than the components illustrated in FIG. 23.

The aforementioned components will now be described in detail.

The user unit 2310 may receive a user input. A user input according to an embodiment may be used to generate printing information. For example, the device 100 may acquire a basic image by using the user input and generate printing information by using the acquired basic image. According to an embodiment, the basic image may denote an image acquired via a user input for acquiring an image.

For example, the device 100 may acquire the basic image via a user input acquired by performing a sketch via a touch on a screen where a touch input is possible. As another example, the device 100 may acquire the basic image by recognizing a sketching operation of a user. As another example, a desk image captured according to a user input of performing photography may be a basic image. As another example, a chair image downloaded from a server according to a user input may be a basic image. The DB 2320 may store a 3D article list acquired from the server 110. The 3D article list may include information about a plurality of 3D articles.

According to an embodiment, the DB 2320 may store the 3D article list. For example, the DB 2320 may acquire information about 3D articles from the server 110 and store the acquired information. The information about the 3D articles may include information related with the 3D articles, such as images of the 3D articles and names of the 3D articles.

According to another embodiment, the DB 2320 may store information about the target article and information about connection relationships between the constituent articles included in the target article. The constituent articles may denote articles that constitute the target article. For example, since a chair may be formed of a chair back, a seat, and legs, the chair, which is a target article, may be formed of constituent articles which are the chair back, the seat, and the legs. In this case, the DB 2320 may store information about a relationship between the chair back and the seat and a relationship between the seat and the legs.

According to another embodiment, the DB 2320 may store weight information of the constituent articles included in the target article. For example, the DB 2320 may store respective weights of the constituent articles of the target article with preset accuracy. The preset accuracy may vary according to settings.

According to another embodiment, the DB 2320 may store information about at least one of directions and ranges in which the constituent articles included in the target article respectively move according to the function of the target article. For example, information about an angle at which the back of the chair is tilt may be stored in the DB 2320.

According to another embodiment, the DB 2320 may store information about the constituent articles included in each of the 3D articles stored in the device 100.

For example, the device 100 may index each of the constituent articles. In this case, the DB 2320 may store a result of the indexing.

As another example, the DB 2320 may store information about joins between the constituent articles. According to an embodiment, when the target article is a chair, the DB 2320 may store information about a join between a chair back and a seat of the chair. The device 100 may display the information about the joins. A method of displaying the information about the joins has been described above with reference to FIG. 12.

As another example, the DB 2320 may store information about operations of the constituent articles included in the target article. The meaning of the information about the operations of the constituent articles has been described above with reference to FIG. 22.

As another example, the DB 2320 may store information related with a method of assembling the target article by using the constituent articles. The information related with the assembling method has been described above with reference to FIGS. 15 and 16.

The controller 2330 may control the input unit 2310, the DB 2320, the display 2340, and the communicator 2350.

According to an embodiment, the controller 2330 may determine a target article. For example, the controller 2330 may determine a target article corresponding to the basic image from the 3D article list stored in the DB 2320. The meaning of the target article corresponding to the basic image has already been described above with reference to FIG. 1.

According to an embodiment, the controller 2330 may use image parts when determining the target article. The image parts may mean a plurality of image parts into which an image is split. For example, when the basic image is a chair image, a chair back image, a seat image, and a chair leg image into which a chair image is split may be image parts for the basic image.

According to an embodiment, the controller 2330 may use the image parts of the basic image when determining the target article corresponding to the basic image from the 3D article list. For example, the controller 2330 may split the basic image into a plurality of image parts and an image of each of the 3D articles included in the 3D article list into a plurality of image parts according to a predetermined criterion and compare the image parts of the basic image with the image parts of each of the 3D articles, thereby determining the target article corresponding to the basic image. For example, when the controller 2330 acquires a first image and a second image by splitting the basic image, acquires a (1-1)th image and a (1-2)th image by splitting a first 3D article, and acquires a (2-1)th image and a (2-2)th image by splitting a second 3D article, the controller 2330 may compare the first image with the (1-1)th image, the second image with the (1-2)th image, the first image with the (2-1)th image, and the second image with the (2-2)th image and thus may determine the target article corresponding to the basic image from among the first 3D article and the second 3D article.

According to another embodiment, the controller 2330 may provide a selection menu for selecting an image corresponding to the basic image from the images of the 3D articles included in the 3D article list. For example, the controller 2330 may display a predetermined number of images that are similar to the basic image from among the images of the 3D articles included in the 3D article list. Similarities between the images of the 3D articles and the basic image may be determined according to a predetermined manner. For example, the controller 2330 may determine similarities between the images of the 3D articles and the basic image, by using the above-described image parts.

According to an embodiment, the controller 2330 may receive a selection input with respect to one of the displayed images of the 3D articles and determine the selected 3D article image as an image of the target article.

The basic image and the image of the target article may share similar features.

According to an embodiment, the controller 2330 may provide a GUI capable of editing the shape of the target article. According to an embodiment, the controller 2330 may provide a GUI capable of editing the shape of the target article according to a user input.

According to another embodiment, the GUI of the controller 2330 may provide an edition menu for editing a specific part of the basic image. The shape of the target article may be edited based on a user input via the GUI.

According to another embodiment, the controller 2330 may provide a recommendation list of constituent articles that are compatible with the constituent articles included in the target article. For example, when the target article is a chair, the controller 2330 may provide a recommendation list of a chair back which is a constituent article included in the chair. In this case, a chair back from among a plurality of displayed back chairs may be determined based on a user input. For example, a chair back image from among a plurality of displayed chair back images may be selected according to a selection input of a user.

The controller 2330 may provide the recommendation list according to a predetermined criterion. For example, the controller 2330 may provide the recommendation list of compatible constituent articles, based on stability of the target article edited by the constituent articles included in the recommendation list. The target article edited by the constituent articles included in the recommendation list may mean a target article that has been edited to include one of the constituent articles included in the recommendation list as a component of the target article.

Stability of an article according to an embodiment may mean a value representing a degree to which the shape or location of the article is maintained without being deformed when an external force is applied to the article.

When a constituent article included in the recommendation list is used as a constituent article of the target article, stability of the target article may be maintained to a predetermined reference or greater. For example when the controller 2330 provides a recommendation list for wooden legs which are a constituent article of an office chair, which is a target article, the controller 2330 may include only wooden legs of which stability is equal to or greater than a predetermined reference when being used in the office chair, which is the target article, in the recommendation list. Stability of the office chair edited by wooden legs included in the recommendation list may be maintained to a predetermined reference or greater. The office chair edited by the wooden legs, which are a constituent article included in the recommendation list, may mean an office chair including the wooden legs, which are a constituent article included in the recommendation list, as the constituent article. Stability of an edited target article according to an embodiment may be determined based on at least one of a location of the center of gravity of the target article edited by a constituent article included in a recommendation list and an internal structure of the target article. For example, a height of the center of gravity of a desk edited by a chair back included in a recommendation list may serve as a criterion for determining the stability of the edited desk. As another example, a structure of an edited desk, such as the area of the ground that contacts the edited desk, or the number of spots where the edited desk and the ground contact, may be used as a criterion for determining the stability of the edited desk.

According to another embodiment, the controller 2330 may provide a recommendation list of compatible constituent articles, based on the prices of the compatible constituent articles. For example, when the conditions of constituent articles other than the price are the same, the controller 2330 may provide, as a recommendation list, constituent articles of which prices are less than or equal to a predetermined reference. As another example, the controller 2330 may include, in the recommendation list, constituent articles of which prices are less than or equal to a predetermined reference or constituent articles of which prices are equal to or greater than a predetermined reference, based on a user input.

According to another embodiment, the controller 2330 may provide a recommendation list of compatible constituent articles, based on the sizes of the compatible constituent articles. For example, when the target article is a desk and a constituent article included therein is a drawer attached to the desk, the controller 2330 may include, in a recommendation list, only drawers of which sizes are compatible with the size of the drawer of the desk which is the target article.

According to another embodiment, the controller 2330 may provide a recommendation list of compatible constituent articles, based on a connection relationship between the target article and each constituent article included in the target article. For example, the controller 2330 may include only constituent articles connectable to the chair, which is the target article, in a recommendation list. Constituent articles unable to be connected with the target article may be excluded from the recommendation list. For example, when the target article is a chair to which only wooden legs are connectable, only wooden leg types may be included in the recommendation list of constituent articles.

According to another embodiment, the controller 2330 may provide an image representing an operation of a constituent article included in the target article according to the function of the target article.

For example, the controller 2330 may provide an image representing an opening or closing operation of the drawer of a desk, which is a target article. As another example, the controller 2330 may provide an image representing a tilting operation of the drawer of the chair, which is the target article.

According to an embodiment, the controller 2330 may edit the shape of the target article, based on a user input via the GUI. For example, the controller 2330 may replace a constituent article included in the target article, based on a user input. As another example, the controller 2330 may change the color of the target article.

A detailed editing method has been described above with reference to FIGS. 7-17B.

According to an embodiment, the controller 2330 may generate 3D printing information. According to an embodiment, the controller 2330 may edit the shape of the target article, based on a user input via the GUI, and may generate printing information for 3D printing the edited target article.

According to an embodiment, the controller 2330 may generate printing information used to 3D print the edited target article. A 3D printer connected to the device 100 may 3D print the edited target article by using the printing information acquired by the device 100. The controller 2330 may generate printing information that is necessary for performing 3D printing on the edited target article. The controller 2330 may transmit the generated printing information to the 3D printer.

According to an embodiment, the controller 2330 may generate manual information representing a method of assembling the edited target article. For example, the controller 2330 may provide the manual information in the form of at least one of a text and an animation.

The display 2340 may display various types of screen images.

Various types of screen images displayed in connection with an operation of the device 100 may be displayed via the display 2340.

For example, the display 2340 may display a basic image acquired using a user input, an image acquired from a server, a GUI image, a description of a constituent article, an image of an edited target article, information about locations of joins between constituent articles, a recommendation list of the constituent article, information about stability of the target article, a method of assembling the target article, options for the target article, and information about an operation of the constituent article.

The communicator 2350 may transmit the printing information used to 3D print the edited target article. The printing information is used to perform printing. The printing information may be generated by the device 100 and transmitted to a 3D printer.

The present invention can also be embodied as a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

The terminology "unit" used herein may be a hardware component such as a processor or a circuit, and/or a software component that is executed by a hardware component such as a processor.

The exemplary embodiments should be considered in descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of generating printing information by a device, the method comprising:
   obtaining, by a controller of the device, an image by recognizing a sketch input via a touch on a screen of a display included in the device;
   obtaining, by the controller, a plurality of constituent article images by splitting the obtained image based on a predetermined criterion according to a type of an article included in the obtained image, the plurality of constituent article images indicating images corresponding to constituent articles of the article included in the obtained image;
   determining, by the controller, a plurality of target article images having a similar shape to the obtained image from a three-dimensional (3D) article list stored in a database (DB) of the device by comparing the constituent article images of the obtained image with constituent article images of each of each of 3D articles included in the 3D article list;
   controlling, by the controller, the display to display the plurality of target article images having the similar shape to the obtained image;
   receiving, via a receiver of the device, a user input selecting one from the plurality of target article images;
   determining, by the controller, a target article image in response to receiving of the user input;
   controlling, by the controller, the display to display information related to a plurality of constituent articles included in the determined target article image;
   editing, by the controller, a shape of the determined target article image, based on a user input selecting the displayed information related to the plurality of constituent articles included in the determined target article image;
   controlling, by the controller, the display to display a target article image edited during the editing of the shape of the determined target article image;
   generating printing information used to 3D print the edited target article image; and
   transmitting, via a communicator of the device, by the controller, the generated printing information to a 3D printer.

2. The method of claim 1, wherein the information related to the plurality of constituent articles comprises a recommendation list of constituent articles that are compatible with a constituent article included in the target article.

3. The method of claim 2, wherein the compatible constituent articles are based on stability of a target article edited by a constituent article included in the recommendation list.

4. The method of claim 3, wherein the stability is determined based on at least one of a location of a center of gravity of the target article edited by the constituent article included in the recommendation list or an internal structure of the edited target article.

5. The method of claim 2, wherein the compatible constituent articles are based on prices of the compatible constituent articles.

6. The method of claim 2, wherein the compatible constituent articles are based on sizes of the compatible constituent articles.

7. The method of claim 2, wherein the compatible constituent articles are based on a connection relationship between the target article and the constituent article included in the target article.

8. The method of claim 2, wherein the information related to the plurality of constituent articles comprises weight information of the constituent article included in the target article.

9. The method of claim 2, wherein the information related to the plurality of constituent articles comprises information about at least one of a direction or a range in which the constituent article included in the target article moves according to a function of the target article.

10. The method of claim 1, wherein the generated printing information comprises manual information representing a method of assembling the edited target article.

11. The method of claim 10, wherein the manual information is in at least one of a text form and an animation form.

12. The method of claim 1, wherein the information related to the plurality of constituent articles comprises an image representing an operation of a constituent article included in the target article according to a function of the target article.

13. The method of claim 1, wherein the information related to the plurality of constituent articles comprises a connection relationship between the target article and a constituent article included in the target article.

14. A device for generating printing information, the device comprising:
   a receiver configured to receive a user input;
   a DB configured to store a 3D article list;
   a display;
   a communicator; and
   a controller configured to:
      obtain an image by recognizing a sketch input via a touch on a screen of the display,
      obtain a plurality of constituent article images by splitting the obtained image based on a predetermined criterion according to a type of an article included in the obtained image, the plurality of constituent article images indicating images corresponding to constituent articles of the article included in the obtained image,
      determine a plurality of target article images having a similar shape to the obtained image from a 3D article list stored in the DB by comparing the constituent article images of the obtained image with constituent article images of each of 3D articles included in the 3D article list,
      control the display to display the plurality of target article images having the similar shape to the obtained image,
      receive, via the receiver, a user input selecting one from the plurality of target article images,
      determine a target article image in response to receiving of the user input,
      control the display to display information related to a plurality of constituent articles included in the determined target article image,
      edit a shape of the determined target article image, based on a user input selecting the displayed information related to the plurality of constituent articles included in the determined target article image,
      control the display to display a target article image edited during the editing of the shape of the determined target article image,
      generate printing information used to 3D print the edited target article image, and
      transmit, via the communicator, the generated printing information to a 3D printer.

15. The device of claim 14, wherein the information related to a plurality of constituent articles comprises a recommendation list of constituent articles that are compatible with a constituent article included in the target article.

16. The device of claim 15, wherein the compatible constituent articles are based on stability of the target article.

17. The device of claim 15, wherein the compatible constituent articles are based on sizes of the compatible constituent articles.

18. The device of claim 14, wherein the generated printed information comprises manual information representing a method of assembling the edited target article.

19. A non-transitory computer-readable recording medium having recorded thereon a program which, when executed by a processor of a device for generating printing information by the device, causes the device to:
   obtain, by a controller of the device, an image by recognizing a sketch input via a touch on a screen of a display included in the device;
   obtain, by the controller, a plurality of constituent article images by splitting the obtained image based on a predetermined criterion according to a type of an article included in the obtained image, the plurality of constituent article images indicating images corresponding to constituent articles of the article included in the obtained image;
   determine, by the controller, a plurality of target article images having a similar shape to the obtained image from a three-dimensional (3D) article list stored in a database (DB) of the device by comparing the constituent article images of the obtained image with constituent article images of each of 3D articles included in the 3D article list;
   control, by the controller, the display to display the plurality of target article images having the similar shape to the obtained image;
   receive, via a receiver of the device, by the controller, a user input selecting one from the plurality of target article images;
   determine, by the controller, a target article image in response to receiving of the user input;
   control, by the controller, the display to display information related to a plurality of constituent articles included in the determined target article image;
   edit, by the controller, a shape of the determined target article image, based on a user input selecting the displayed information related to the plurality of constituent articles included in the determined target article image;
   control, by the controller, the display to display a target article image edited during the editing of the shape of the determined target article image;
   generate printing information used to 3D print the edited target article image; and
   transmit, via a communicator of the device, by the controller, the generated printing information to a 3D printer.

* * * * *